(12) United States Patent
Ishiguchi

(10) Patent No.: US 12,313,168 B2
(45) Date of Patent: May 27, 2025

(54) ROTARY VALVE DEVICE

(71) Applicant: MIKUNI CORPORATION, Tokyo (JP)

(72) Inventor: Shoichi Ishiguchi, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 340 days.

(21) Appl. No.: 17/966,893

(22) Filed: Oct. 17, 2022

(65) Prior Publication Data

US 2023/0175600 A1  Jun. 8, 2023

(30) Foreign Application Priority Data

Dec. 3, 2021 (JP) .................................. 2021-197240

(51) Int. Cl.
*F16K 11/085* (2006.01)
*F16K 31/00* (2006.01)

(52) U.S. Cl.
CPC ........ *F16K 11/0856* (2013.01); *F16K 31/002* (2013.01)

(58) Field of Classification Search
CPC .... F01P 2060/04; F01P 2060/08; F01P 7/165; F16K 11/0856; F16K 11/0873; F16K 27/067; F16K 31/002; F16K 5/0689
See application file for complete search history.

(56) References Cited

U.S. PATENT DOCUMENTS

| | | | |
|---|---|---|---|
| 2020/0158248 A1* | 5/2020 | Kanzaki | ................... F16K 5/201 |
| 2020/0158347 A1* | 5/2020 | Cowan | ................... F16K 5/0242 |
| 2021/0010604 A1* | 1/2021 | Murakami | ................ F01P 7/16 |

FOREIGN PATENT DOCUMENTS

JP    2021148244    9/2021

* cited by examiner

*Primary Examiner* — Henry T Crenshaw
(74) *Attorney, Agent, or Firm* — JCIPRNET

(57) ABSTRACT

The rotary valve device includes a valve 30, a housing H having a joining surface $14b_1$ located at ends of a fitting hole 14a and a through hole 16, a thermostat 110 partially accommodated in the through hole 16, a cylindrical seal member 80, an urging spring 90, and a passage member 60. The passage member 60 includes a cylindrical holding member 61 that is fitted into the fitting hole 14a and holds the cylindrical seal member 80 and the urging spring 90, and a connector member 62. The connector member 62 includes an annular fitting recess $62a_3$ into which a part of the cylindrical holding member 61 is fitted, and a detour passage $62a_4$ that is divided from the fitting recess by a wall portion to partially accommodate the thermostat and bypasses the cylindrical seal member to communicate with the through hole.

13 Claims, 18 Drawing Sheets

| Flow passage | Control mode | | | |
| --- | --- | --- | --- | --- |
| | Mode 1 | Mode 2 | Mode 3 | Mode 4 |
| Oil cooler | Close | Close | Open | Open |
| Heater | Close | Open | Open | Open |
| Radiator | Close | Close | Close | Open |

FIG. 18

ROTARY VALVE DEVICE

CROSS-REFERENCE TO RELATED APPLICATION

This application claims the priority benefits of Japanese application no. 2021-197240, filed on Dec. 3, 2021. The entirety of the above-mentioned patent application is hereby incorporated by reference herein and made a part of this specification.

BACKGROUND

Technical Field

The disclosure relates to a rotary valve device that rotates a valve around an axis to open/close a passage for a fluid, and in particular relates to a rotary valve device applied when controlling the flow of cooling water of an engine mounted on a vehicle or the like.

Description of Related Art

As a conventional rotary valve device, a control valve is known, which includes a cylindrical valve having a passage that opens on an outer peripheral wall, a casing rotatably accommodating the valve and having a radiator port that defines a radiator outflow port extending in the radial direction and a fail opening, a thermostat arranged in the fail opening, a seal cylinder member arranged to abut on the outer peripheral wall of the valve in the radiator outflow port, an urging member urging the seal cylinder member toward the outer peripheral wall, an annular seal member arranged between the outer peripheral surface of the seal cylinder member and the inner peripheral surface of the radiator outflow port, a holding ring restricting the movement of the annular seal member, and a joint member as a passage member which is assembled to the casing to receive an end of the urging member and is connected to a pipe that communicates with the radiator outflow port and communicates with a radiator (see, for example, Patent Literature 1).

In this control valve, when assembled, the thermostat is inserted into a fail passage, and the seal cylinder member, the annular seal member, the holding ring, and the urging member are sequentially inserted into the radiator outflow port, an annular end of the joint member is fitted into the radiator port to press the urging member from the outside, and the joint member is assembled and fixed to the casing.

After a seal mechanism (seal module) composed of a plurality of members (seal cylinder member, annular seal member, holding ring, and urging member) is inserted in this way, the joint member has to be assembled in a state of poor visibility. Therefore, the already inserted members may be misaligned when the joint member is assembled, and the assembling work is complicated. In order to solve this problem, if a cylindrical portion for holding the plurality of members with respect to the joint member is integrally formed, the joint member is formed with a confluence passage portion that receives a part of the thermostat and communicates with the fail opening. For this reason, undercut occurs when molding with a mold, and it is difficult to establish the mold.

RELATED ART

Patent Literature

[Patent Literature 1] Japanese Patent Laid-Open No. 2021-148244

SUMMARY

The disclosure provides a rotary valve device, which can easily mold the passage member with a mold or the like, facilitates the assembling work, and can assemble the seal module composed of a plurality of members with high accuracy.

A rotary valve device according to the disclosure includes a cylindrical valve that rotates around a predetermined axis and has a passage which opens on an outer peripheral wall; a housing that rotatably accommodates the valve and has a fitting hole facing the outer peripheral wall, a through hole adjacent to the fitting hole, and a joining surface located at ends of the fitting hole and the through hole; a thermostat that is partially accommodated in the through hole; a cylindrical seal member that abuts on the outer peripheral wall and defines a passage; an urging spring that urges the cylindrical seal member toward the outer peripheral wall; and a passage member that is assembled to the housing to communicate with the passage of the cylindrical seal member. The passage member includes a cylindrical holding member that is fitted into the fitting hole and holds the cylindrical seal member and the urging spring, and a connector member that defines a main passage communicating with the passage of the cylindrical seal member and is joined to the joining surface to be connected to outside. The connector member includes an annular fitting recess into which a part of the cylindrical holding member is fitted, and a detour passage that is divided from the fitting recess by a wall portion to partially accommodate the thermostat and bypasses the cylindrical seal member to communicate with the through hole.

The rotary valve device may adopt a configuration in which the cylindrical holding member and the connector member are molded products molded by molding using the same material.

The rotary valve device may adopt a configuration in which the connector member includes a flange base portion that defines a part of the main passage, the fitting recess, and the detour passage and is joined to the joining surface, and a pipe portion that protrudes from the flange base portion and defines a part of the main passage with which the detour passage communicates.

The rotary valve device may adopt a configuration in which the pipe portion is formed so as to extend in an angular direction inclined with respect to center line directions of the fitting hole and the through hole.

The rotary valve device may adopt a configuration in which a center line of the detour passage is arranged around a center line of the fitting recess at a position deviated from a center line of the pipe portion.

The rotary valve device may adopt a configuration in which the cylindrical holding member holds an annular seal member that provides sealing between an inner peripheral surface of the cylindrical holding member and an outer peripheral surface of the cylindrical seal member.

The rotary valve device may adopt a configuration in which the cylindrical holding member includes a regulating portion that restricts detachment of the cylindrical seal member in a state where the urging spring, the annular seal member, and the cylindrical seal member are incorporated on an inner side of the cylindrical holding member.

The rotary valve device may adopt a configuration in which the housing has an inflow port where a fluid constantly flows in and an outflow port where the fluid constantly flows out, and the through hole is formed at a position facing a passage region linearly connecting the inflow port and the outflow port so as to expose a heat sensing part of the thermostat to the fluid that constantly flows.

The rotary valve device may adopt a configuration in which the housing is formed in a cylindrical shape that is long in a direction of the axis, and the inflow port and the outflow port are arranged in the housing so as to open in a radial direction perpendicular to the axis.

The rotary valve device may adopt a configuration in which the housing includes a housing body that defines an internal space which is long in the direction of the axis and has an opening at one end, and a housing cover that is joined to the housing body so as to close the opening.

The rotary valve device may adopt a configuration in which the housing body has an accommodation recess that accommodates a drive unit for driving the valve on a side opposite to the opening in the direction of the axis.

The rotary valve device may adopt a configuration in which the housing body includes a flange portion that is to be attached to a wall portion of a target object, and an annular joining portion that defines the outflow port in an inner region of the flange portion.

The rotary valve device may adopt a configuration in which the outer peripheral wall of the valve has a plurality of outer peripheral surfaces that form spherical surfaces continuous in the direction of the axis, and the cylindrical seal member is arranged to face at least one outer peripheral surface of the plurality of outer peripheral surfaces.

With the rotary valve device having the above configuration, the passage member can be easily molded with a mold or the like, the assembling work is easy, and the seal module composed of a plurality of members can be assembled with high accuracy.

BRIEF DESCRIPTION OF THE DRAWINGS

FIG. 18 is a table showing the opened/closed state of the valve in the rotary valve device according to an embodiment.

DESCRIPTION OF THE EMBODIMENTS

Figure 1:
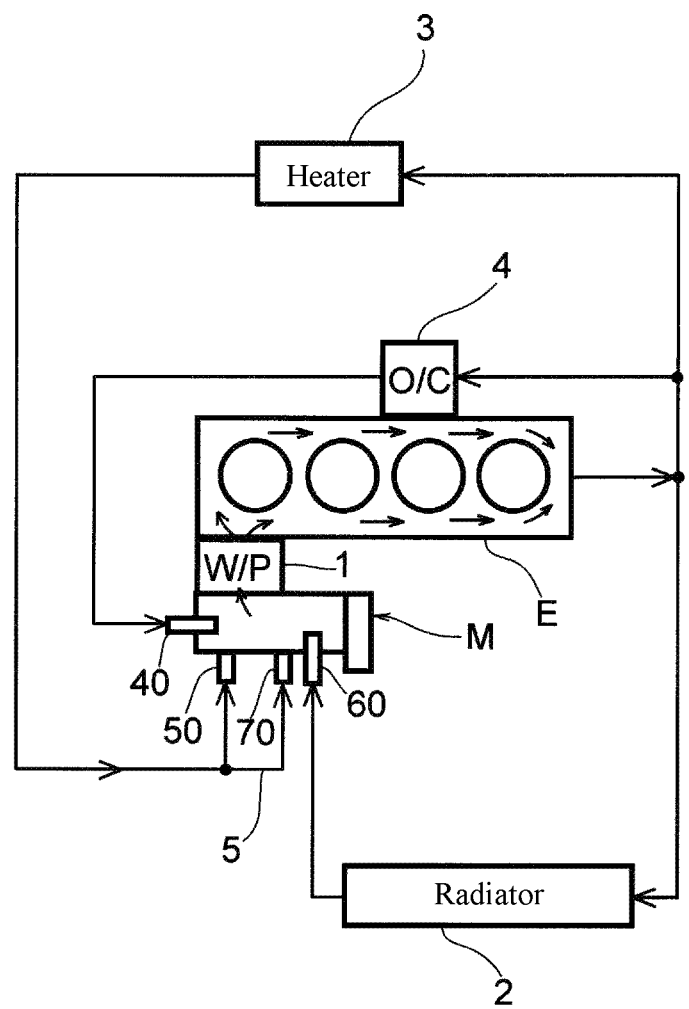
FIG. 1 is a block diagram showing a state where the rotary valve device according to the disclosure is applied to a cooling water circulation system of an engine.

Hereinafter, an embodiment of the rotary valve device according to the disclosure will be described with reference to the accompanying drawings. As shown in FIG. 1, a rotary valve device M according to an embodiment is attached to the upstream side of a water pump 1 in an engine E mounted on a vehicle, which serves as a target object, and is connected to a radiator 2, a heater 3, and an oil cooler 4 via pipes to be incorporated into a cooling water circulation system that controls the flow of cooling water. In this cooling water circulation system, part of the cooling water flowing through the heater 3 constantly circulates through the rotary valve device M via a bypass passage 5. Here, part of the cooling water flowing through the heater 3 is applied as the cooling water that constantly circulates, but a throttle body, an EGR valve or the like mounted on the engine E may be incorporated into the system, and the cooling water flowing through these may be applied as the cooling water that constantly circulates.

As shown in FIG. 2 to FIG. 11, the rotary valve device M includes a housing body 10 and a housing cover 20 serving as a housing H, a valve 30 rotating around an axis S, passage members 40, 50, and 60, a connector member 70, three seal modules m1, m2, and m3, a thermostat 110, and a drive unit 120. The three seal modules m1, m2, and m3 are configured by a cylindrical seal member 80, an urging spring 90, and an annular seal member 100, respectively. Since the cylindrical seal members 80, the urging springs 90, and the annular seal members 100 constituting the three seal modules m1, m2, and m3 have the same configuration except for the dimensions, they are shown using the same reference signs.

The housing body 10 is formed of a resin material, an aluminum material, or the like, and as shown in FIG. 3 to FIG. 10, the housing body 10 includes an accommodation chamber 11, four connection fitting portions 12, 13, 14, and 15, a through hole 16, a flange portion 17, a partition wall 18, and an accommodation recess 19.

The accommodation chamber 11 is formed as a cylindrical internal space that is long in the direction of the axis S and is centered on the axis S, and rotatably accommodates the valve 30 around the axis S with a gap from an outer peripheral wall 33 of the valve 30. Further, an opening 11a into which the valve 30 can be inserted is formed at one end of the accommodation chamber 11 in the direction of the axis S.

Figure 5:
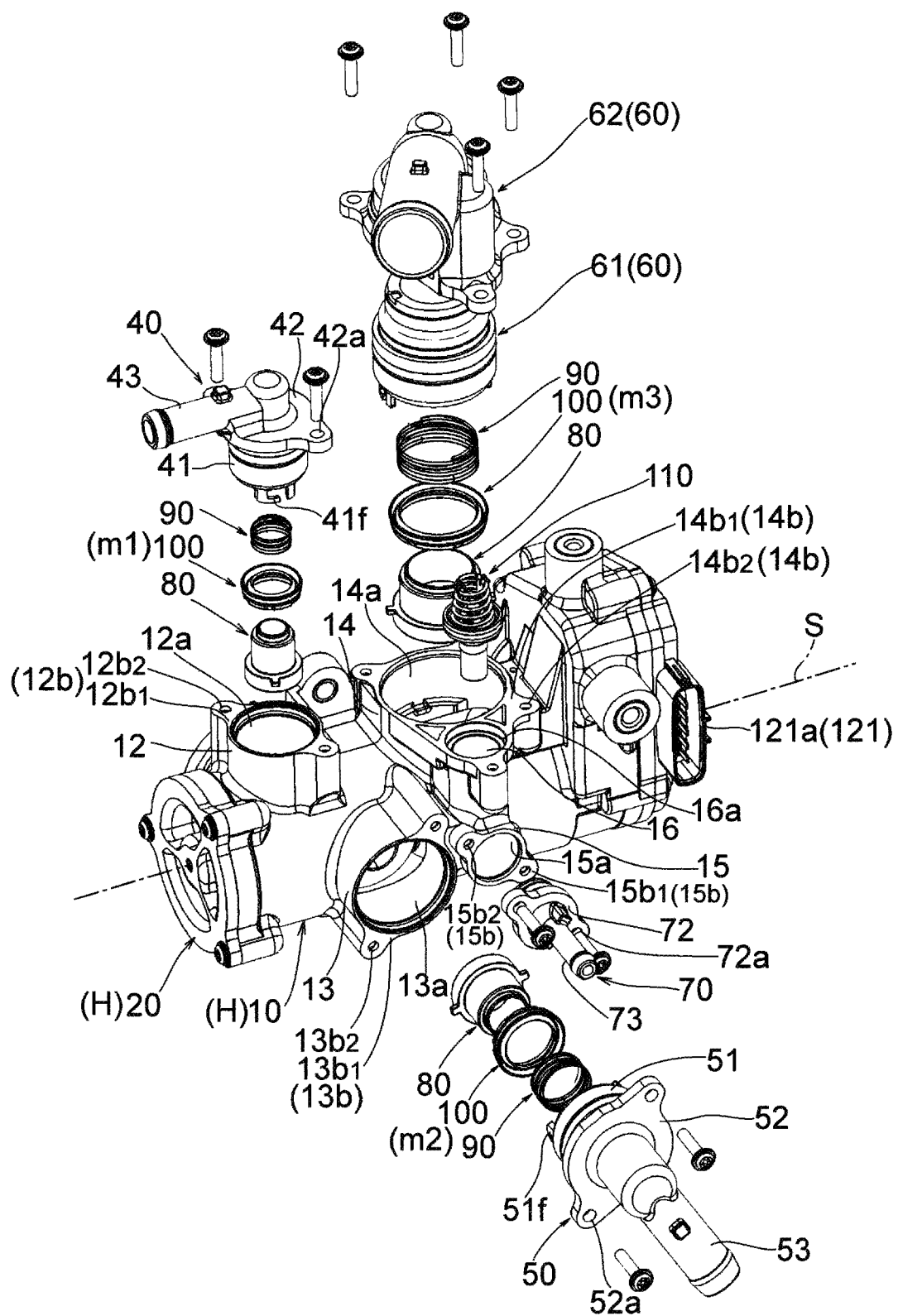
FIG. 5 is an exploded perspective view of the rotary valve device according to an embodiment.
Figure 6:
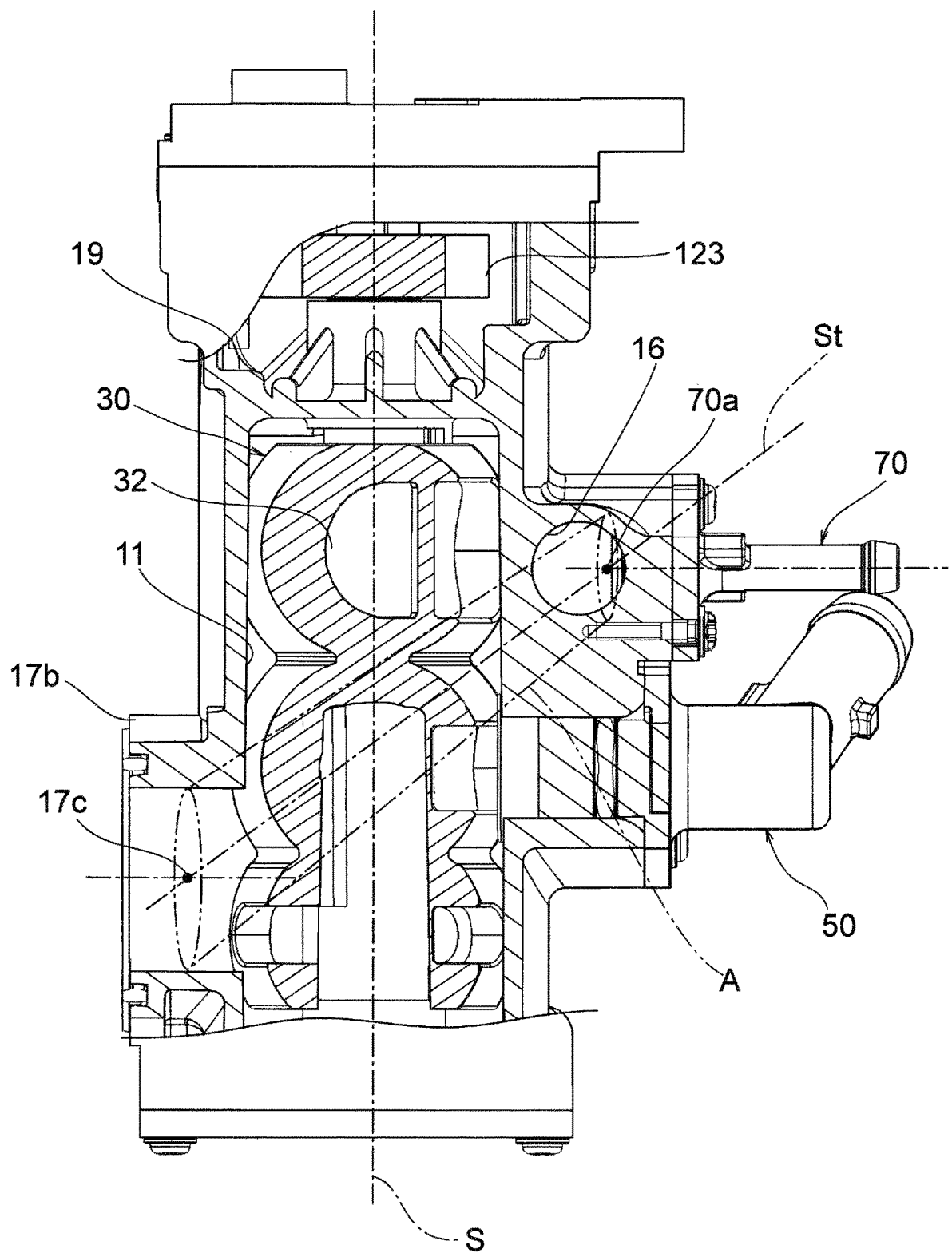
FIG. 6 is a cross-sectional view of the rotary valve device according to an embodiment in a plane parallel to the axis of the valve.
Figure 8:
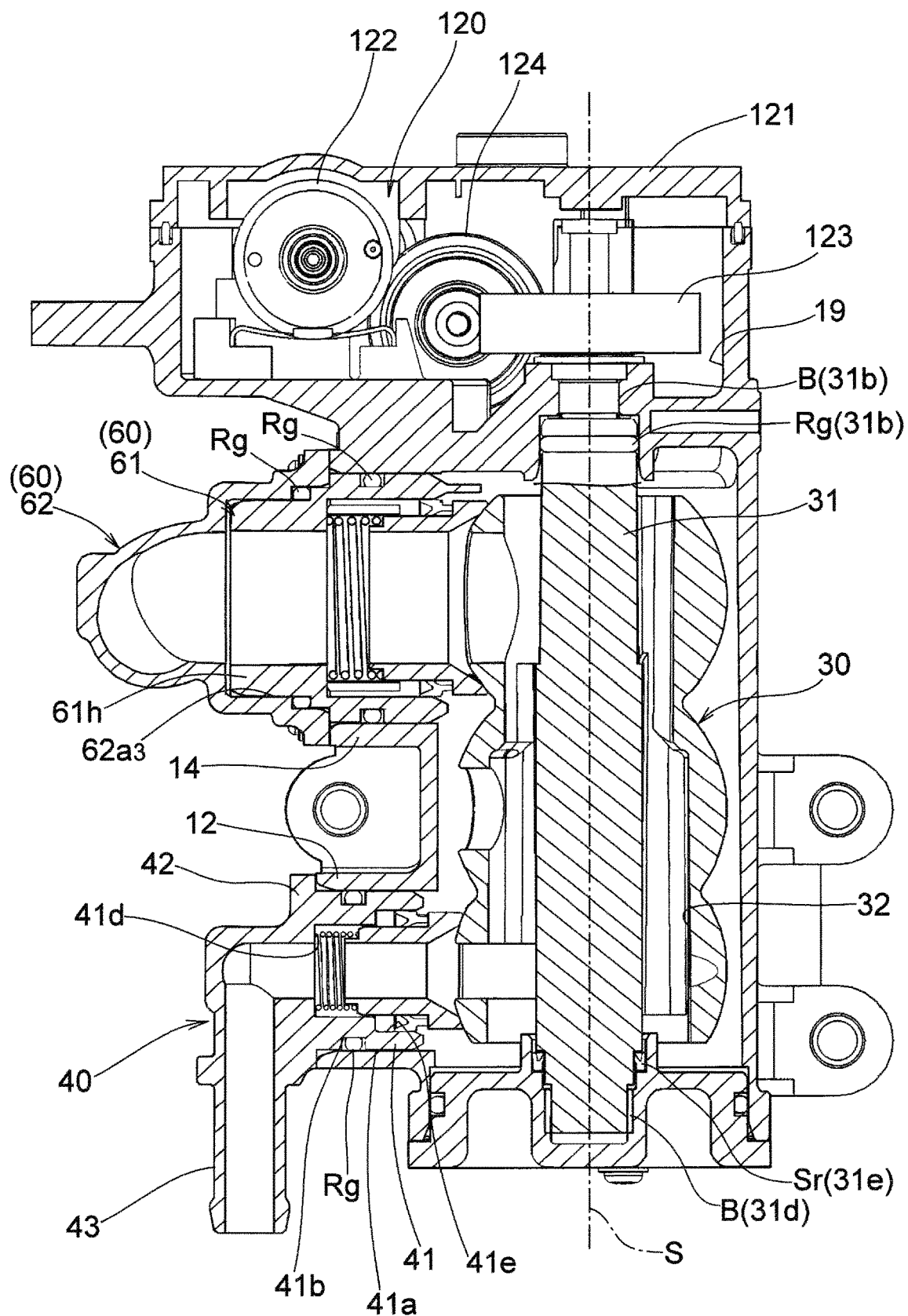
FIG. 8 is a cross-sectional view of the rotary valve device according to an embodiment in a plane parallel to the axis of the valve and perpendicular to the cross section shown in FIG. 7.

As shown in FIG. 5 and FIG. 8, the connection fitting portion 12 includes a fitting hole 12a extending in a direction perpendicular to the axis S, and a connecting portion 12b connecting the passage member 40. The fitting hole 12a is formed as a cylindrical surface so as to fit a cylindrical holding portion 41 that forms a part of the passage member 40, and is provided at a position facing a first outer peripheral surface 33a of the valve 30 in the radial direction. As shown in FIG. 5, the connecting portion 12b has a joining surface 12$b_1$ to which the flange portion 42 of the passage member 40 is joined, and a screw hole 12$b_2$.

Figure 7:
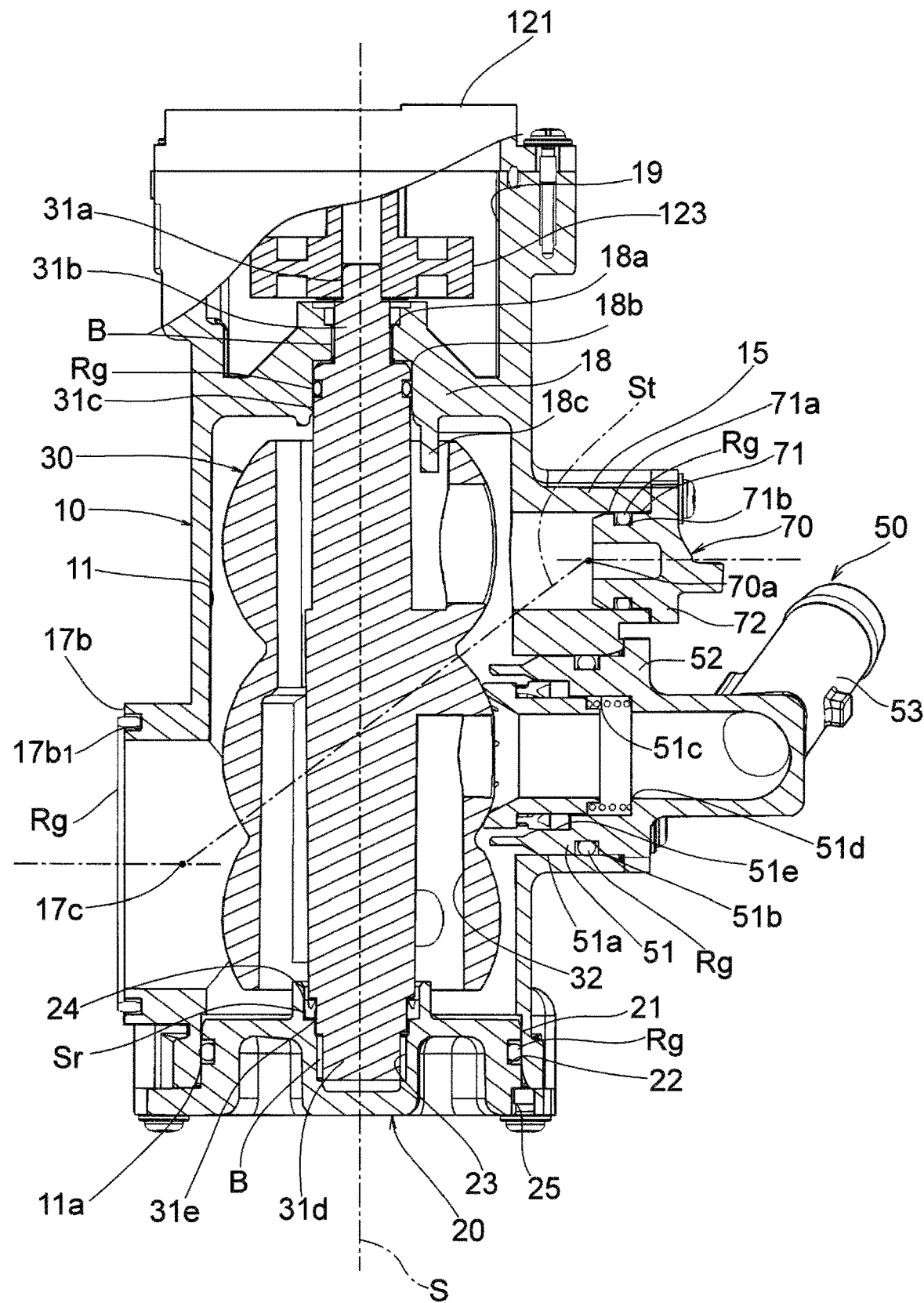
FIG. 7 is a cross-sectional view of the rotary valve device according to an embodiment in a plane parallel to the axis of the valve and passing through the center of the outflow port.

As shown in FIG. 5 and FIG. 7, the connection fitting portion 13 includes a fitting hole 13a extending in a direction perpendicular to the axis S, and a connecting portion 13b connecting the passage member 50. The fitting hole 13a is formed as a cylindrical surface so as to fit a cylindrical holding portion 51 that forms a part of the passage member 50, and is provided at a position facing a second outer peripheral surface 33b of the valve 30 in the radial direction. As shown in FIG. 5, the connecting portion 13b has a joining surface 13$b_1$ to which the flange portion 52 of the passage member 50 is joined, and a screw hole 13$b_2$.

Figure 10:
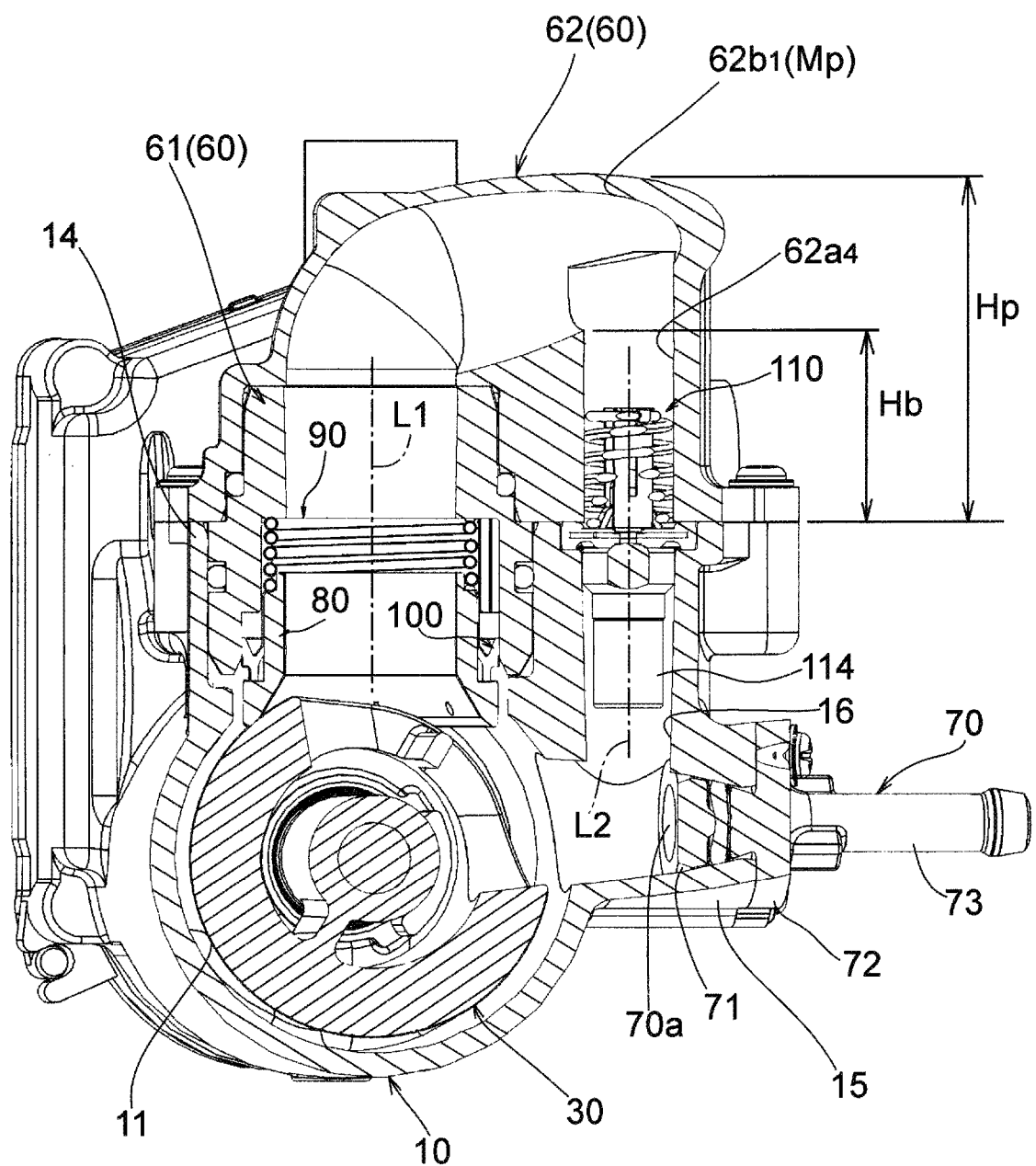
FIG. 10 is a cross-sectional view of the rotary valve device according to an embodiment in a plane passing through the substantially center line of the cylindrical holding member and the detour passage that form a part of the passage member.

As shown in FIG. 5, FIG. 8, and FIG. 10, the connection fitting portion 14 includes a fitting hole 14a extending in a direction perpendicular to the axis S, and a connecting portion 14b connecting the passage member 60. The fitting hole 14a is formed as a cylindrical surface so as to fit a cylindrical holding member 61 that holds the seal module m3, and is provided at a position facing a third outer peripheral surface 33c of the valve 30 in the radial direction. As shown in FIG. 5, the connecting portion 14b has a joining surface 14$b_1$ to which a flange base portion 62a of a connector member 62 constituting the passage member 60 is joined, and a screw hole 14$b_2$.

As shown in FIG. 5, FIG. 6, FIG. 7, and FIG. 9, the connection fitting portion 15 includes a fitting hole 15a extending in a direction perpendicular to the axis S, and a connecting portion 15b connecting the connector member 70. The fitting hole 15a is formed as a cylindrical surface so as to fit a fitting cylinder portion 71 of the connector member 70. As shown in FIG. 5, the connecting portion 15b has a joining surface 15$b_1$ to which a flange portion 72 of the connector member 70 is joined, and a screw hole 15$b_2$.

As shown in FIG. 5 and FIG. 10, the through hole 16 is adjacent to the fitting hole 14a in the region of the joining surface 14$b_1$ of the connection fitting portion 14, and is formed as a cylindrical surface having a center line L2 parallel to a center line L1 of the fitting hole 14a, and an annular recess 16a into which a flanged seal portion 111 of the thermostat 110 is fitted is formed at an end of the through hole 16. Then, a heat sensing part 114 of the thermostat 110 is inserted into the through hole 16 with a gap.

Figure 2:
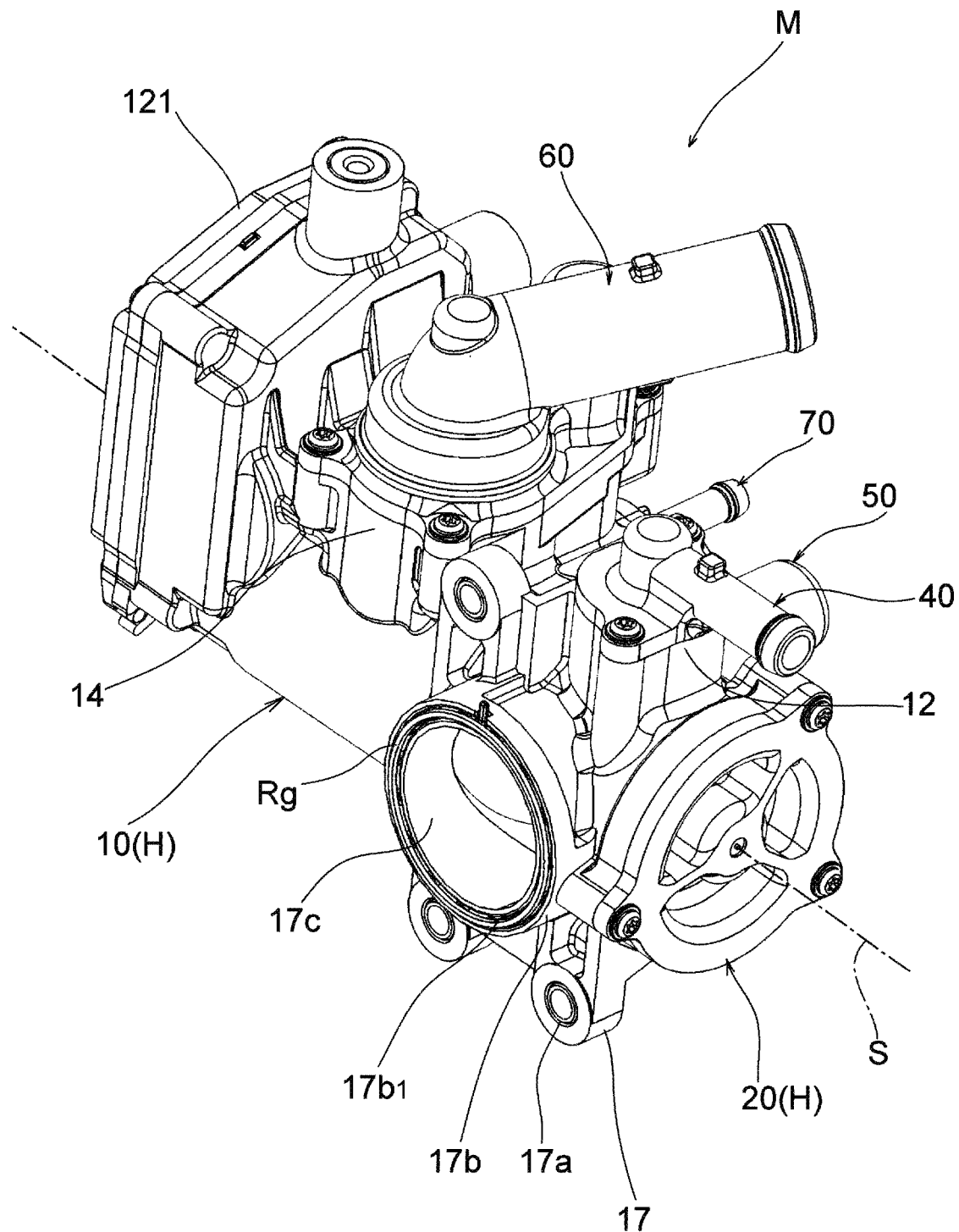
FIG. 2 is an external perspective view showing the rotary valve device according to an embodiment of the disclosure, as viewed from the outflow port side.

As shown in FIG. 1 and FIG. 2, the flange portion 17 is joined to a wall portion of the engine E on the upstream side of the water pump 1 accommodated in the engine E, and the flange portion 17 includes three circular holes 17a through which bolts to be fastened to the wall portion of the engine E pass, and an annular joining portion 17b that defines an opening 17c in the inner region surrounded by the three circular holes 17a. An annular groove 17$b_1$ into which an O-ring Rg is fitted is formed in the annular joining portion 17b.

Figure 9:
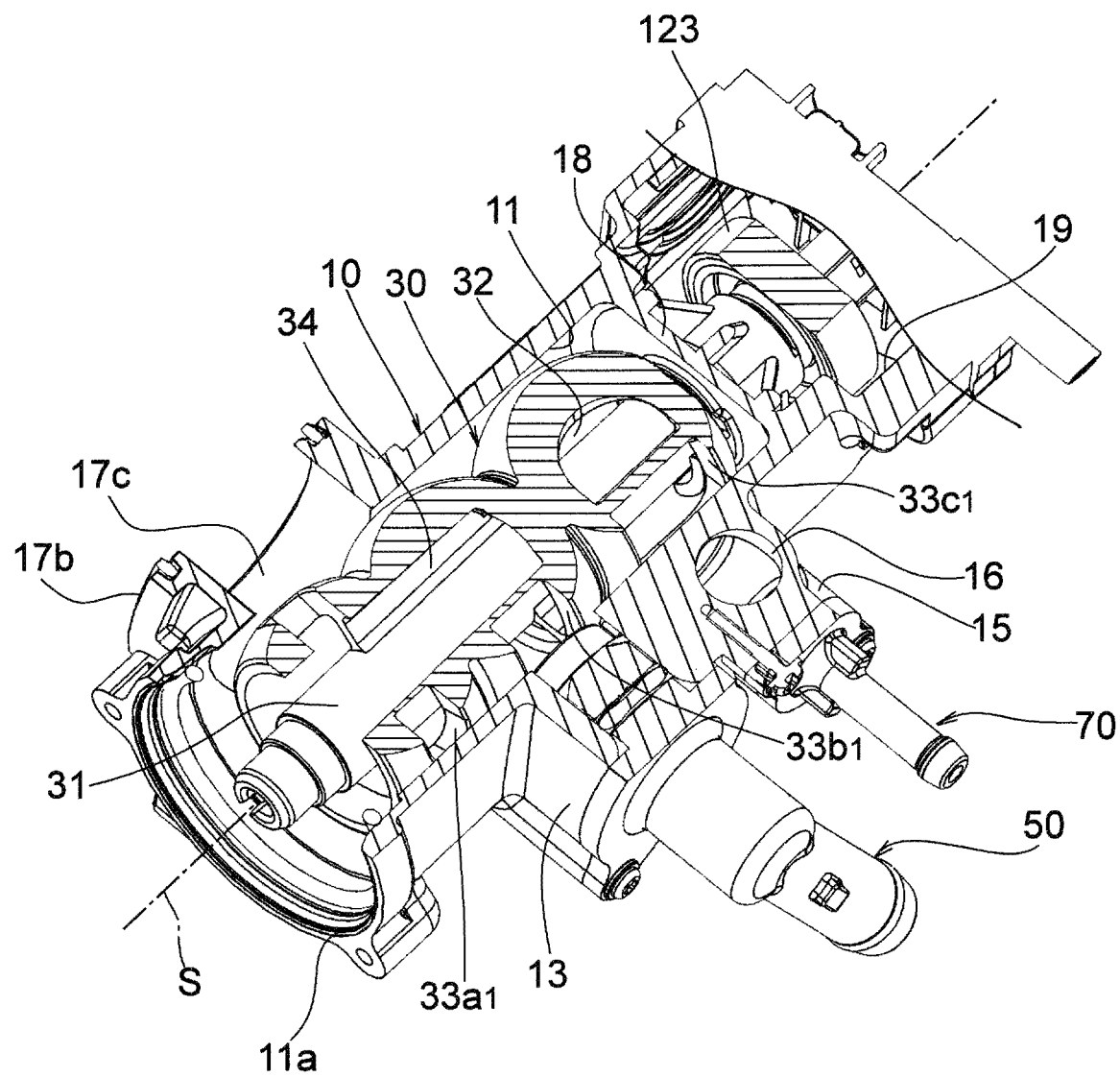
FIG. 9 is a perspective cross-sectional view of the rotary valve device according to an embodiment in a plane parallel to the axis of the valve.

As shown in FIG. 7 and FIG. 9, the partition wall 18 partitions the accommodation chamber 11 accommodating the valve 30 and the accommodation recess 19 accommodating the drive unit 120, and the partition wall 18 includes a bearing hole 18a that supports a rotation shaft 31 of the valve 30, a seal hole 18b that the O-ring Rg contacts, and a stopper 18c that is detachably engaged with a spoke portion 34 of the valve 30 to restrict the rotation angle of the valve 30.

As shown in FIG. 7 to FIG. 9, the accommodation recess 19 is a region that accommodates the drive unit 120 for driving the valve 30, and is formed on the side opposite to the opening 11a with the partition wall 18 interposed therebetween in the direction of the axis S of the housing body 10.

The housing cover 20 is formed of a resin material, an aluminum material, or the like, and as shown in FIG. 2, FIG. 5, FIG. 7, and FIG. 8, the housing cover 20 includes a fitting portion 21 fitted into the opening 11a of the housing body 10, an annular groove 22 which is formed on the outer peripheral surface of the fitting portion 21 and into which the O-ring Rg is fitted, a bearing hole 23 supporting a small diameter portion 31d located at an end of the rotation shaft 31 of the valve 30, a seal hole 24 into which a seal member Sr is fitted, and three circular holes 25 through which screws pass. As described above, since the housing H is formed by the housing body 10 that defines the accommodation chamber 11 and the housing cover 20 that closes the opening 11a, the valve 30 can be easily assembled to be rotatable around the axis S by inserting the valve 30 into the accommodation chamber 11 and joining the housing cover 20.

The valve 30 is formed using a resin material that has excellent wear resistance and slidability, and as shown in FIG. 6 to FIG. 9, FIG. 12, and FIG. 13, the valve 30 includes the rotation shaft 31 centered on the axis S, an internal passage 32, the outer peripheral wall 33, and a plurality of spoke portions 34 connecting the outer peripheral wall 33 to the rotation shaft 31.

The rotation shaft 31 is formed in a multi-stage columnar shape centered on the axis S, and the rotation shaft 31 includes a connecting portion 31a, a small diameter portion 31b, and a large diameter portion 31c on one end side and includes the small diameter portion 31d and a large diameter portion 31e on the other end side. The connecting portion 31a is formed to connect and fix a gear 123 included in the drive unit 120. The small diameter portion 31d is supported by the bearing hole 18a of the housing body 10 via a bush B. The large diameter portion 31c has an annular groove into which the O-ring Rg is fitted and is inserted into the seal hole 18$b$ of the housing body 10 so that the outer peripheral surface is sealed by the O-ring Rg. The small diameter portion 31$d$ is supported in the bearing hole 23 of the housing cover 20 via the bush B. The outer peripheral surface of the large diameter portion 31$e$ is sealed by the lip-shaped seal member Sr fitted into the seal hole 24 of the housing cover 20.

The outer peripheral wall 33 is arranged with a gap from the inner peripheral surface defining the accommodation chamber 11 of the housing body 10, and has outer peripheral surfaces, that is, the first outer peripheral surface 33$a$, the second outer peripheral surface 33$b$, and the third outer peripheral surface 33$c$, which form a plurality of spherical surfaces continuous in the direction of the axis S. The first outer peripheral surface 33$a$ is formed into a spherical surface that has a predetermined width in the direction of the axis S and has a center on the axis S, and has two openings 33$a_1$ that are long in the circumferential direction and communicate with the internal passage 32. The second outer peripheral surface 33$b$ is formed into a spherical surface that has a width larger than the first outer peripheral surface 33$a$ in the direction of the axis S and has a center on the axis S, and has one opening 33$b_1$ that is long in the circumferential direction and communicates with the internal passage 32. The third outer peripheral surface 33$c$ is formed into a spherical surface that has a width equal to the second outer peripheral surface 33$b$ in the direction of the axis S and has a center on the axis S, and has one opening 33$c_1$ that is long in the circumferential direction and communicates with the internal passage 32.

Figure 13:
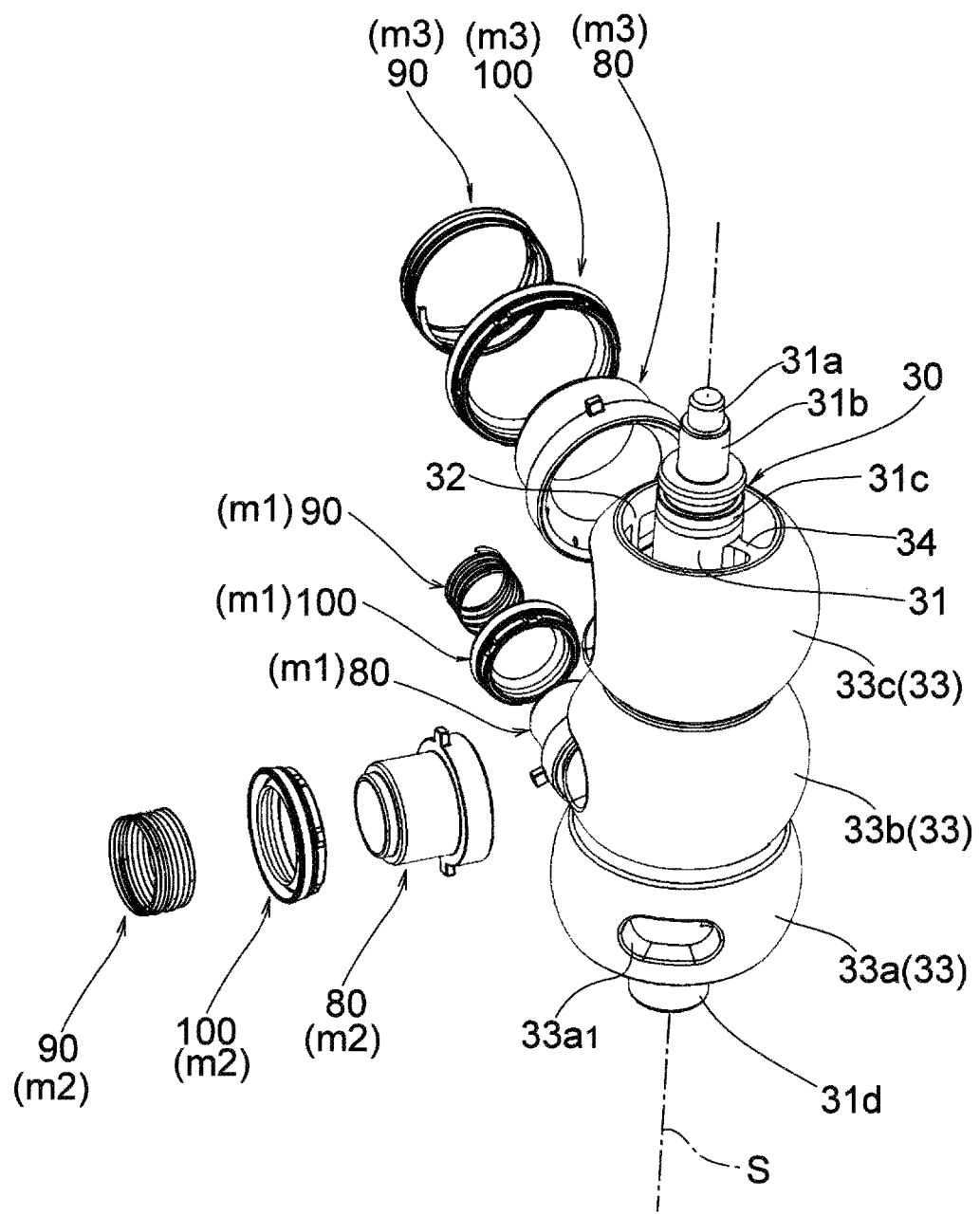
FIG. 13 is an exploded perspective view showing the relationship between the seal module (cylindrical seal member, urging spring, annular seal member) and the valve included in the rotary valve device according to an embodiment, as viewed from an angle different from the angle shown in FIG. 12.

The spoke portions 34 are formed to discretely connect the outer peripheral wall 33 to the rotation shaft 31 so that the internal passage 32 is defined in the direction of the axis S and in a direction intersecting the axis S. Further, as the spoke portion 34 located at an end abuts on the stopper 18$c$ formed on the partition wall 18 of the housing body 10 in the assembled state, as shown in FIG. 7 and FIG. 13, the rotation range of the valve 30 is restricted.

That is, the valve 30 is accommodated in the housing H to be rotatable around the axis S, and has passages (internal passages 32, a plurality of openings 33$a_1$, 33$b_1$, 33$c_1$) that open on the outer peripheral wall 33. In addition, in the valve 30, the rotation shaft 31 is fitted into a through hole (not shown) in the center and integrally coupled after the outer peripheral wall 33 and the spoke portion 34 are integrally molded, but the rotation shaft 31 may be integrally molded.

The passage member 40 is a molded product molded by a mold using a resin material, an aluminum material, or the like, and as shown in FIG. 5 and FIG. 8, the passage member 40 includes the cylindrical holding portion 41, the flange portion 42, and a pipe portion 43. The cylindrical holding portion 41 includes a cylindrical outer peripheral surface 41$a$ fitted into the fitting hole 12$a$ of the housing body 10, an annular groove 41$b$ into which the O-ring Rg is fitted, an insertion passage 41$c$ into which the urging spring 90 and the cylindrical seal member 80 are reciprocatively inserted, an annular receiving portion 41$d$ receiving an end of the urging spring 90, an inner peripheral surface 41$e$ into which the annular seal member 100 is closely fitted, and two L-shaped regulating portions 41$f$ that lock the protrusions 85 of the cylindrical seal member 80 to restrict detachment of the cylindrical seal member 80.

That is, the cylindrical holding portion 41 can incorporate the seal module m1 (urging spring 90, annular seal member 100, and cylindrical seal member 80) in advance. The flange portion 42 is formed to be joined to the joining surface 12$b_1$ of the connection fitting portion 12 of the housing body 10, and includes two circular holes 42$a$ through which screws to be screwed into the screw holes 12$b_2$ pass. The pipe portion 43 is formed to protrude outward from the flange portion 42 and bend and extend in parallel with the axis S. A pipe communicating with the oil cooler 4 is connected to the pipe portion 43. Then, the cylindrical holding portion 41 holding the seal module m1 is fitted into the fitting hole 12$a$ and the flange portion 42 is joined to the joining surface 12$b_1$, and the screws are screwed into the screw holes 12$b_2$ through the circular holes 42$a$ so that the passage member 40 is fixed to the housing body 10.

The passage member 50 is a molded product molded by a mold using a resin material, an aluminum material, or the like, and as shown in FIG. 5 and FIG. 7, the passage member 50 includes the cylindrical holding portion 51, the flange portion 52, and a pipe portion 53. The cylindrical holding portion 51 includes a cylindrical outer peripheral surface 51$a$ fitted into the fitting hole 13$a$ of the housing body 10, an annular groove 51$b$ into which the O-ring Rg is fitted, an insertion passage 51$c$ into which the urging spring 90 and the cylindrical seal member 80 are reciprocatively inserted, an annular receiving portion 51$d$ receiving an end of the urging spring 90, an inner peripheral surface 51$e$ into which the annular seal member 100 is closely fitted, and two L-shaped regulating portions 51$f$ that lock the protrusions 85 of the cylindrical seal member 80 to restrict detachment of the cylindrical seal member 80.

That is, the cylindrical holding portion 51 can incorporate the seal module m2 (urging spring 90, annular seal member 100, and cylindrical seal member 80) in advance. The flange portion 52 is formed to be joined to the joining surface 13$b_1$ of the connection fitting portion 13 of the housing body 10, and includes two circular holes 52$a$ through which screws to be screwed into the screw holes 13$b_2$ pass. The pipe portion 53 is formed to protrude outward from the flange portion 52 and bend and extend in the twisting direction with respect to the axis S. A pipe communicating with the heater 3 is connected to the pipe portion 53. Then, the cylindrical holding portion 51 holding the seal module m2 is fitted into the fitting hole 13$a$ and the flange portion 52 is joined to the joining surface 13$b_1$, and the screws are screwed into the screw holes 13$b_2$ through the circular holes 52$a$ so that the passage member 50 is fixed to the housing body 10.

As described above, since the passage members 40 and 50 are provided with the cylindrical holding portions 41 and 51 that are integrally formed and can hold the seal modules m1 and m2 in a state of incorporating the seal modules m1 and m2 in advance, the passage members 40 and 50 can be handled as module products incorporating the seal modules m1 and m2, and can be easily assembled to the housing body 10, and the entire assembling work when assembling the device M becomes easy. Further, the seal modules m1 and m2 can be assembled with high accuracy.

The passage member 60 is formed of a resin material, an aluminum material, or the like, and as shown in FIG. 5, FIG. 8, FIG. 10, FIG. 16, and FIG. 17, the passage member 60 is configured by the cylindrical holding member 61 and the connector member 62 that is fitted and connected to the cylindrical holding member 61. Here, the cylindrical holding member 61 and the connector member 62 are molded products molded by molding using the same material.

Figure 16:
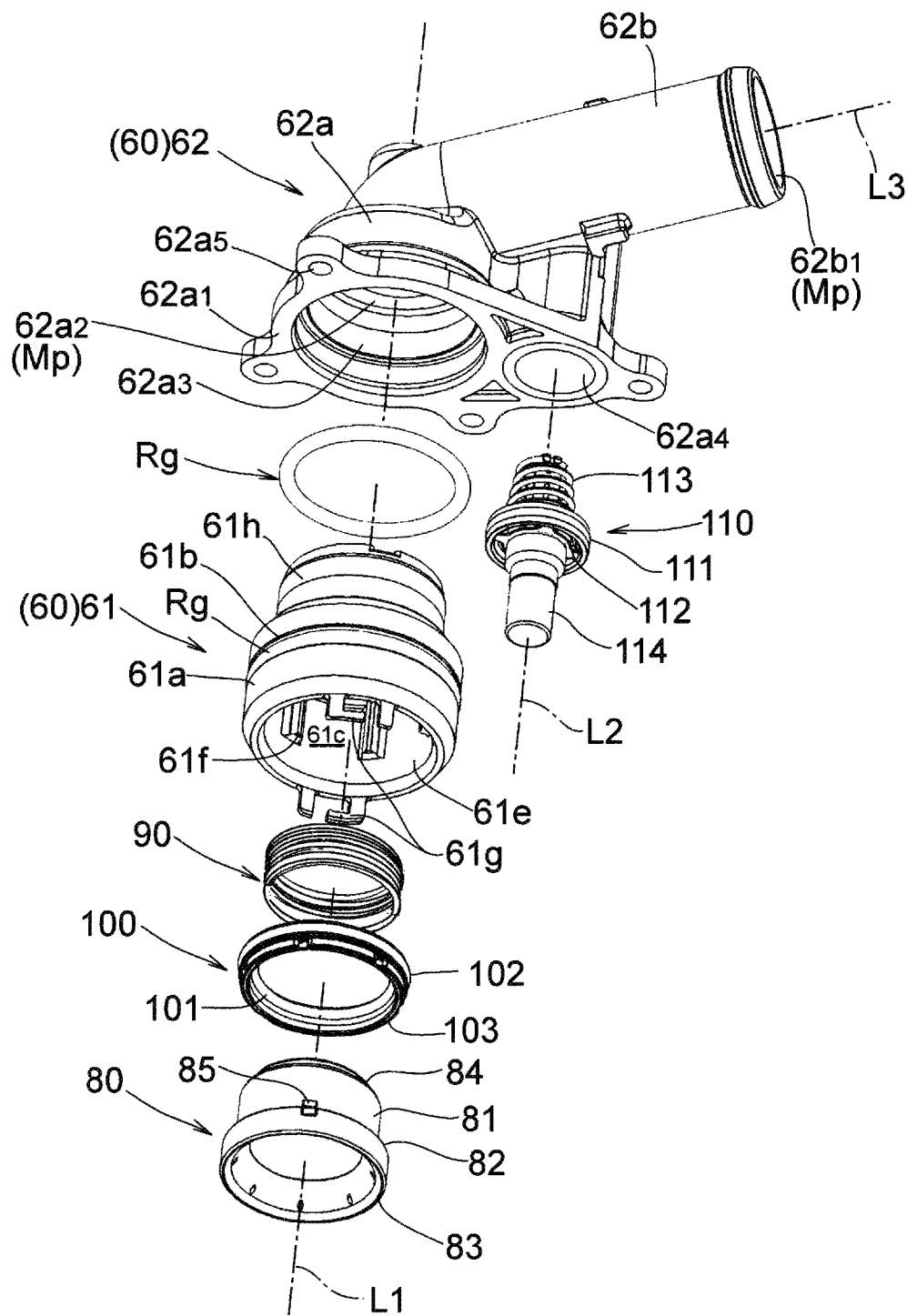
FIG. 16 is an exploded perspective view showing the passage member (cylindrical holding member, connector member), the seal module (cylindrical seal member, urging spring, annular seal member), and the thermostat included in the rotary valve device according to an embodiment.
Figure 17:
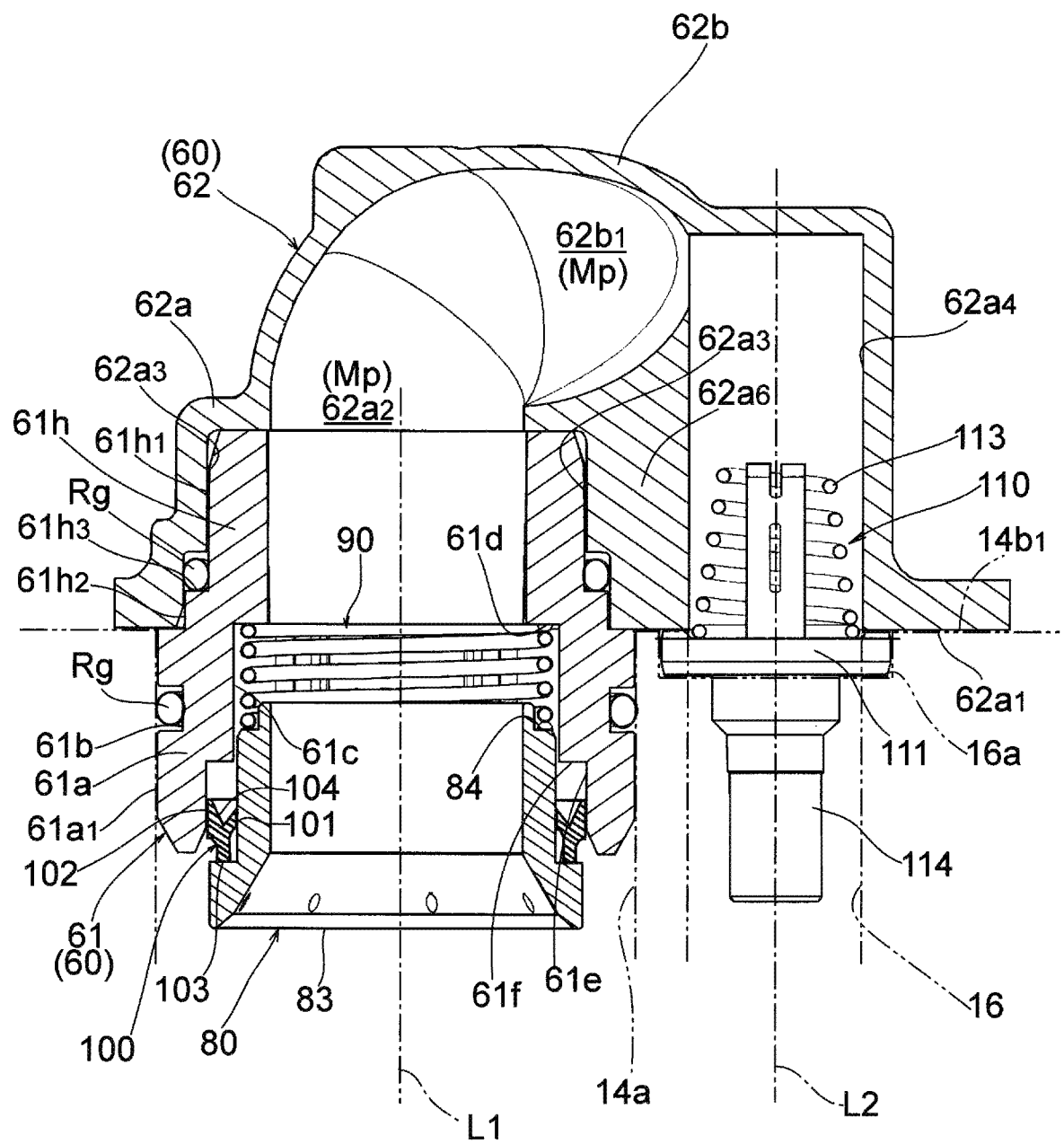
FIG. 17 is a cross-sectional view showing a state where the connector member is fitted to a part of the cylindrical holding member holding the seal module (cylindrical seal member, annular seal member, urging spring) and fixed to the housing, and an arrangement state of the thermostat with respect to the detour passage.

As shown in FIG. 16 and FIG. 17, the cylindrical holding member 61 includes a cylindrical fitting portion 61$a$, an annular groove 61$b$, an insertion passage 61$c$, an annular receiving portion 61$d$, an inner peripheral surface 61$e$, a plurality of protruding guide portions 61$f$, two regulating portions 61g, and a cylindrical fitting portion 61h. The cylindrical fitting portion 61a has an outer peripheral surface 61a₁ that is fitted into the fitting hole 14a of the housing body 10. The annular groove 61b is formed on the outer peripheral surface 61a₁ so as to fit the O-ring Rg. The insertion passage 61c is formed so that the urging spring 90 and the cylindrical seal member 80 can be reciprocatively inserted with a gap. The annular receiving portion 61d is formed on an annular flat surface that receives an end of the urging spring 90. The inner peripheral surface 61e is formed so as to fit the annular seal member 100 closely.

The plurality of protruding guide portions 61f are formed to protrude inward in the radial direction from the inner peripheral surface 61e and extend in the direction of the center line L1 thereof so as to guide the cylindrical seal member 80 reciprocatively while restricting the tilting of the urging spring 90. The regulating portion 61g is formed in an L shape to lock the protrusion 85 of the cylindrical seal member 80 to restrict detachment of the cylindrical seal member 80. The cylindrical fitting portion 61h includes a small-diameter outer peripheral surface 61h₁ fitted into a fitting recess 62a₃ of the connector member 62, a large-diameter outer peripheral surface 61h₂, and an annular receiving surface 61h₃ formed at the boundary between the outer peripheral surface 61h₁ and the outer peripheral surface 61h₂ to receive the O-ring Rg.

That is, the cylindrical holding member 61 is formed to be fitted into the fitting hole 14a of the housing body 10 and hold the seal module m3 (cylindrical seal member 80, urging spring 90, annular seal member 100). Further, the cylindrical holding member 61 is assembled to the housing body 10 by fitting the cylindrical fitting portion 61a into the fitting hole 14a in a state where the seal module m3 is incorporated in the insertion passage 61c and the O-ring Rg is fitted into the annular groove 61b.

The connector member 62 defines a main passage Mp communicating with the cylindrical seal member 80 and is connected to the outside, and as shown in FIG. 14 to FIG. 17, the connector member 62 includes the flange base portion 62a and a pipe portion 62b protruding from the flange base portion 62a. The flange base portion 62a is formed to define a joining surface 62a₁ joined to the joining surface 14b₁ of the housing body 10, an upstream passage 62a₂ which is a part of the main passage Mp, an annular fitting recess 62a₃ into which the cylindrical fitting portion 61h of the cylindrical holding member 61 is fitted, a detour passage 62a₄, and four circular holes 62a₅ through which screws pass.

Figure 14:
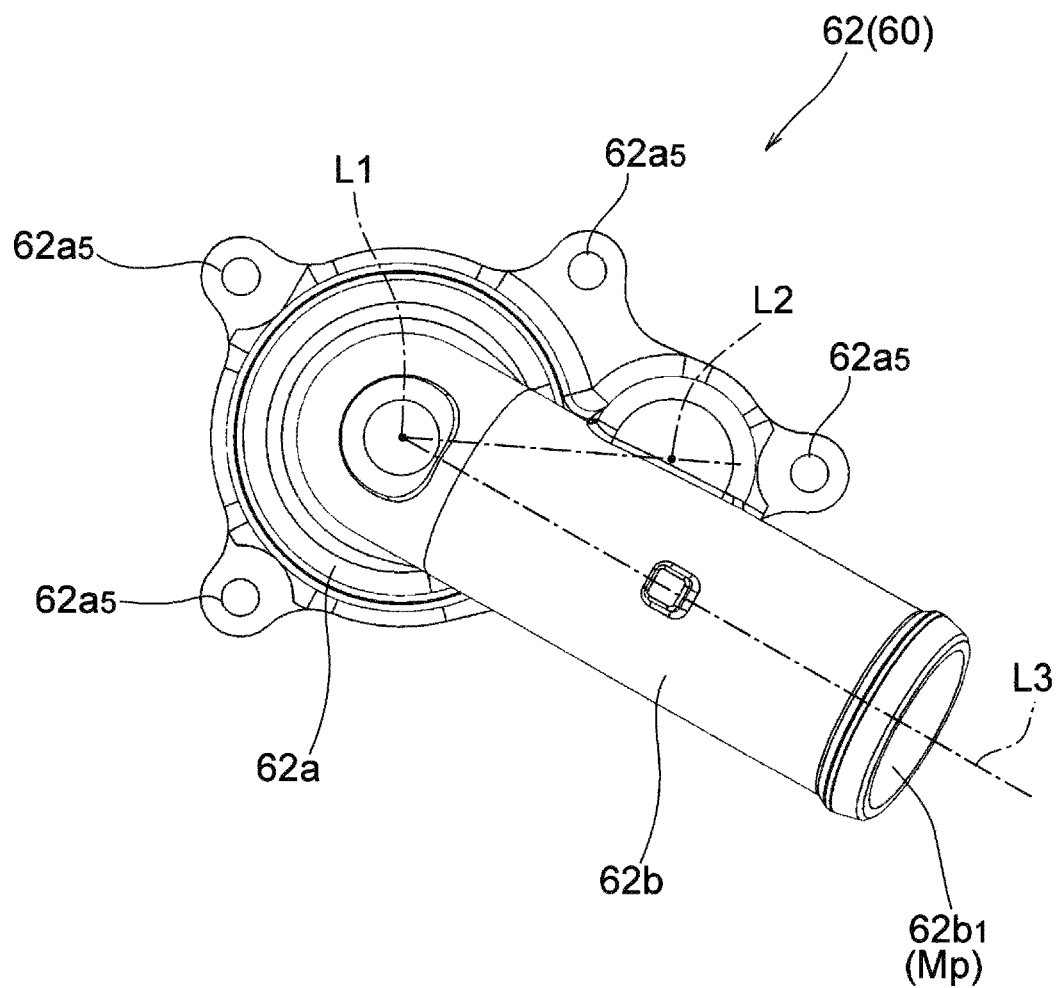
FIG. 14 is a plan view showing the connector member forming a part of the passage member included in the rotary valve device according to an embodiment.

The fitting recess 62a₃ is formed as a two-stage recess having a small diameter and a large diameter so as to fit the cylindrical fitting portion 61h of the cylindrical holding member 61. The detour passage 62a₄ is divided from the fitting recess 62a₃ by the wall portion 62a₆ and is formed to partially accommodate the thermostat 110 and bypass the cylindrical seal member 80 to communicate with the through hole 16 of the housing body 10. Here, as shown in FIG. 14, the center line L2 of the detour passage 62a₄ is arranged around the center line L1 of the fitting recess 62a₃ at a position deviated from the center line L3 of the pipe portion 62b.

The pipe portion 62b is formed to protrude from the flange base portion 62a and define a downstream passage 62b₁ which is a part of the main passage Mp with which the detour passage 62a₄ communicates. Here, as shown in FIG. 16, the pipe portion 62b is formed to extend in an angular direction (direction of the center line L3) inclined with respect to the center line L1 of the fitting hole 14a (fitting recess 62a₃) of the housing body 10 and the center line L2 of the through hole 16. Then, the cylindrical fitting portion 61h of the cylindrical holding member 61 is fitted into the fitting recess 62a₃ and the joining surface 62a₁ of the flange base portion 62a is joined to the joining surface 14b₁, and the screws are screwed into the screw holes 14b₂ so that the connector member 62 is fixed to the housing body 10. That is, as shown in FIG. 8 and FIG. 10, in a state where the passage member 60 is assembled to the housing body 10 with the connector member 62 connected to the cylindrical holding member 61 by fitting, the main passage Mp abuts on the outer peripheral wall 33 of the valve 30 and communicates with the cylindrical seal member 80 that defines the passage.

In the passage member 60 having the above configuration, the cylindrical holding member 61 formed separately from the connector member 62 is adopted, and the cylindrical holding member 61 incorporating the seal module m3 (cylindrical seal member 80, urging spring 90, annular seal member 100) to keep the seal module m3 from falling off can be fitted into the fitting hole 14a of the housing body 10 to be assembled. Therefore, when the connector member 62 is assembled, misalignment of each component constituting the seal module m3 can be prevented, and the assembling work can be performed easily with high accuracy. Further, the connector member 62 can closely connect the cylindrical fitting portion 61h and the fitting recess 62a₃ by fitting the cylindrical fitting portion 61h of the cylindrical holding member 61 into the fitting recess 62a₃. Therefore, the desired seal performance can be ensured in the connection region between them. In particular, even if the cylindrical holding member 61 and the connector member 62 are separate components, they are formed of the same material, so the rates of expansion or contraction due to heat are the same, and the adhesion in the connection region between them can be improved.

Furthermore, since the pipe portion 62b is formed to extend in an angular direction (direction of the center line L3) inclined with respect to the center line L1 of the fitting hole 14a (fitting recess 62a₃) and the center line L2 of the through hole 16, the detour passage 62a₄ can be communicated with the downstream passage 62b₁ which is a part of the main passage Mp that the pipe portion 62b defines as a straight passage. As a result, it is possible to secure a space for partially arranging the thermostat 110 in the detour passage 62a₄. Further, the wall portion 62a₆ can be provided between the detour passage 62a₄ and the fitting recess 62a₃ to divide them into independent passages. Therefore, the fitting recess 62a₃ can be formed into a perfect annular shape without a notch, and the cylindrical fitting portion 61h can be reliably fitted. Moreover, as shown in FIG. 14, since the center line L2 of the detour passage 62a4 is arranged around the center line L1 of the fitting recess 62a₃ at a position deviated from the center line L3 of the pipe portion 62b, as shown in FIG. 10, it is possible to suppress the height Hp of the pipe portion 62b protruding from the flange base portion 62a while setting the detour passage 62a₄ that can partially accommodate the thermostat 110 to the desired passage length Hb.

Figure 15:
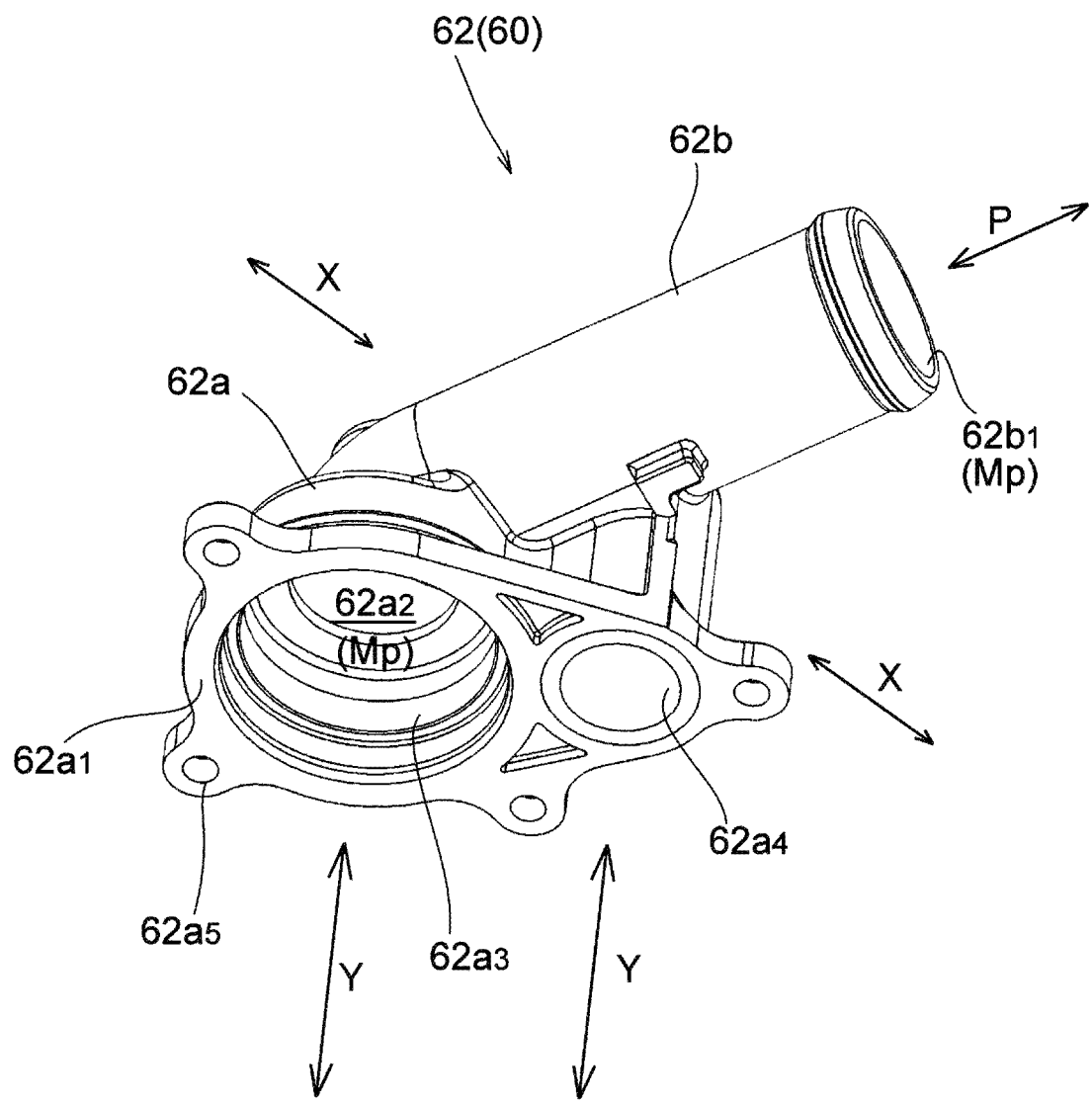
FIG. 15 is a perspective view showing the connector member forming a part of the passage member included in the rotary valve device according to an embodiment.

In addition, since the passage member 60 is configured by separate members, the cylindrical holding member 61 and the connector member 62, the detour passage 62a₄ accommodating the thermostat 110 can be integrally molded with the connector member 62 easily. That is, when the connector member 62 is molded by a mold, as shown in FIG. 15, the mold divided into two can be divided in the X direction, and three slide cores can be slid in the Y direction and the P direction, respectively. As a result, the connector member 62 can be easily molded by a mold without causing undercut.

The connector member 70 defines a passage for a fluid (cooling water) and is formed of a resin material, an aluminum material, another metal material, or the like, and as shown in FIG. 3, FIG. 5, FIG. 7, FIG. 9, and FIG. 10, the connector member 70 includes the fitting cylinder portion 71, the flange portion 72, and a pipe portion 73. The fitting cylinder portion 71 includes a cylindrical outer peripheral surface 71a to be fitted into the fitting hole 15a of the housing body 10, and an annular groove 71b into which the O-ring Rg is fitted. The flange portion 72 includes two circular holes 72a through which screws to be screwed into the screw holes $15b_2$ pass in a state where the flange portion 72 is joined to the joining surface $15b_1$ of the housing body 10. The pipe portion 73 is formed to extend in a direction perpendicular to the axis S, and is connected to the bypass passage 5 branched from the pipe connected to the heater 3. Then, the fitting cylinder portion 71 is fitted into the fitting hole 15a and the flange portion 72 is joined to the joining surface $15b_1$, and the screws are screwed into the screw holes $15b_2$ so that the connector member 70 is fixed to the housing body 10.

The cylindrical seal members 80, the urging springs 90, and the annular seal members 100 constituting the seal modules m1, m2, and m3 are formed as shown in FIG. 12, FIG. 13, FIG. 16, and FIG. 17. The cylindrical seal member 80 is formed of a resin material having excellent wear resistance and slidability, and includes a cylindrical portion 81 that defines a passage, an annular step portion 82 formed on the outer periphery of the cylindrical portion 81, an annular seal portion 83 that abuts on the outer peripheral wall 33 of the valve 30, an annular receiving portion 84 that receives an end of the urging spring 90, and two protrusions 85 that are locked to the regulating portions 61g of the cylindrical holding member 61. The urging spring 90 is a compression type coil spring, and has one end abutting on the annular receiving portion 61d of the cylindrical holding member 61 and the other end abutting on the annular receiving portion 84 of the cylindrical seal member 80 to urge the cylindrical seal member 80 toward the outer peripheral wall 33 of the valve 30. The annular seal member 100 is formed of a rubber material in an annular shape having a substantially V or U-shaped cross section, and includes an inner peripheral surface 101 in close contact with the outer peripheral surface of the cylindrical portion 81, an outer peripheral surface 102 in close contact with the inner peripheral surface 61e of the cylindrical holding member 61, an end surface 103 that abuts on the annular step portion 82 of the cylindrical seal member 80, and a concave pressure receiving surface 104.

The thermostat 110 is a relief valve that opens the detour passage $62a_4$ when the temperature of the fluid (cooling water) exceeds a planned level, and as shown in FIG. 16 and FIG. 17, the thermostat 110 includes the flanged seal portion 111, a valve portion 112, an urging spring 113 that urges the valve portion 112 in the valve closing direction, and the heat sensing part 114 that expands at a predetermined temperature or higher and moves the valve portion 112 in the valve opening direction against the urging force of the urging spring 113. Then, as shown in FIG. 10, the flanged seal portion 111 is fitted into the annular recess 16a of the housing body 10, the region of the heat sensing part 114 is arranged in the through hole 16, and the region including the urging spring 113 of the thermostat 110 is accommodated in the detour passage $62a_4$ of the connector member 62.

Figure 3:
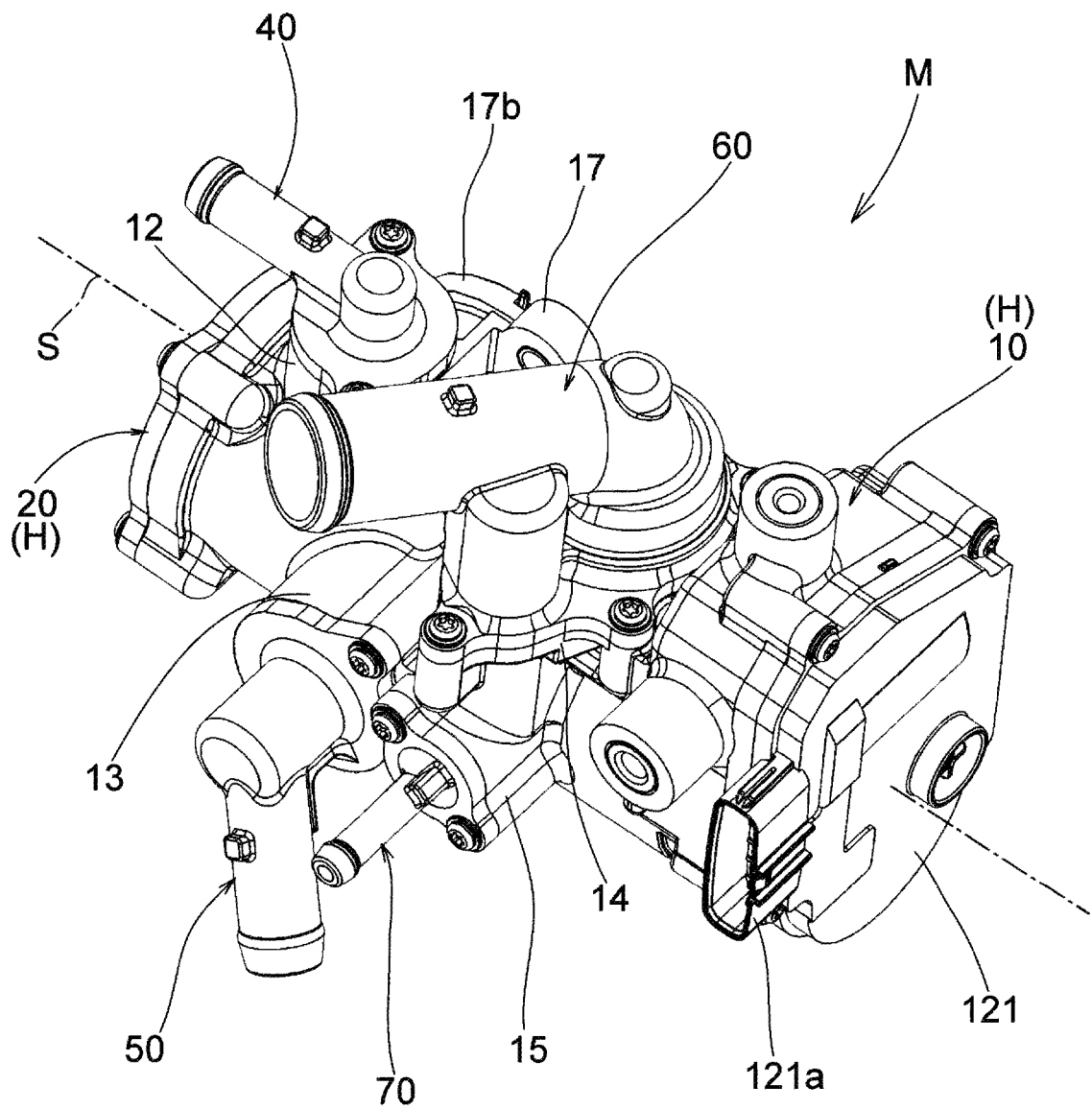
FIG. 3 is an external perspective view of the rotary valve device according to an embodiment, as viewed from the side opposite to the outflow port.
Figure 4:
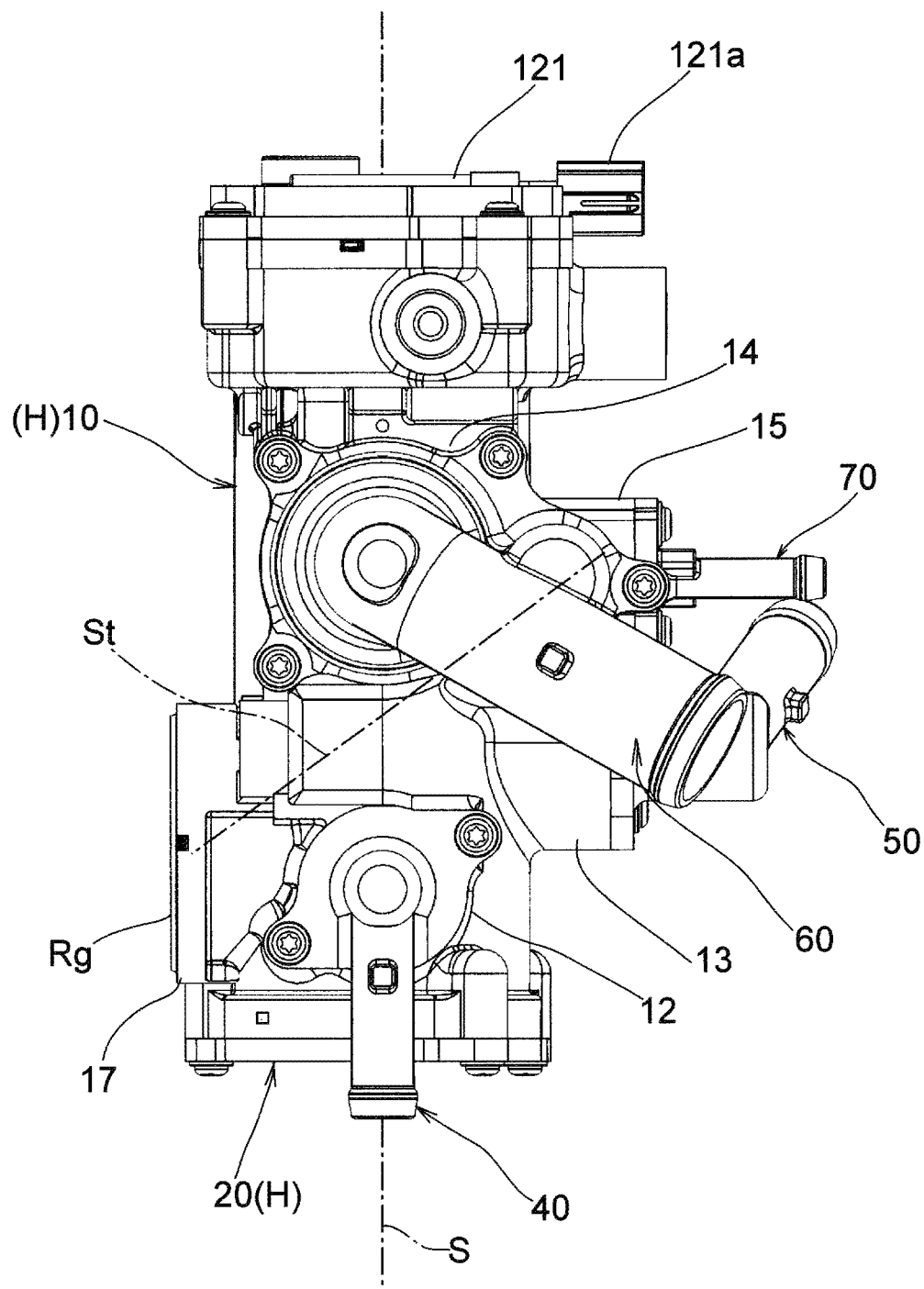
FIG. 4 is a plan view of the rotary valve device according to an embodiment.

As shown in FIG. 3, FIG. 8, and FIG. 9, the drive unit 120 is arranged in the accommodation recess 19 of the housing body 10 and exerts a rotational driving force on the valve 30. The drive unit 120 includes a cover 121 having a connector 121a electrically connected to the outside, a motor 122, the gear 123 connected to the connecting portion 31a of the valve 30, and a gear train 124 including a multi-stage gear interposed between the motor 122 and the gear 123.

Figure 11:
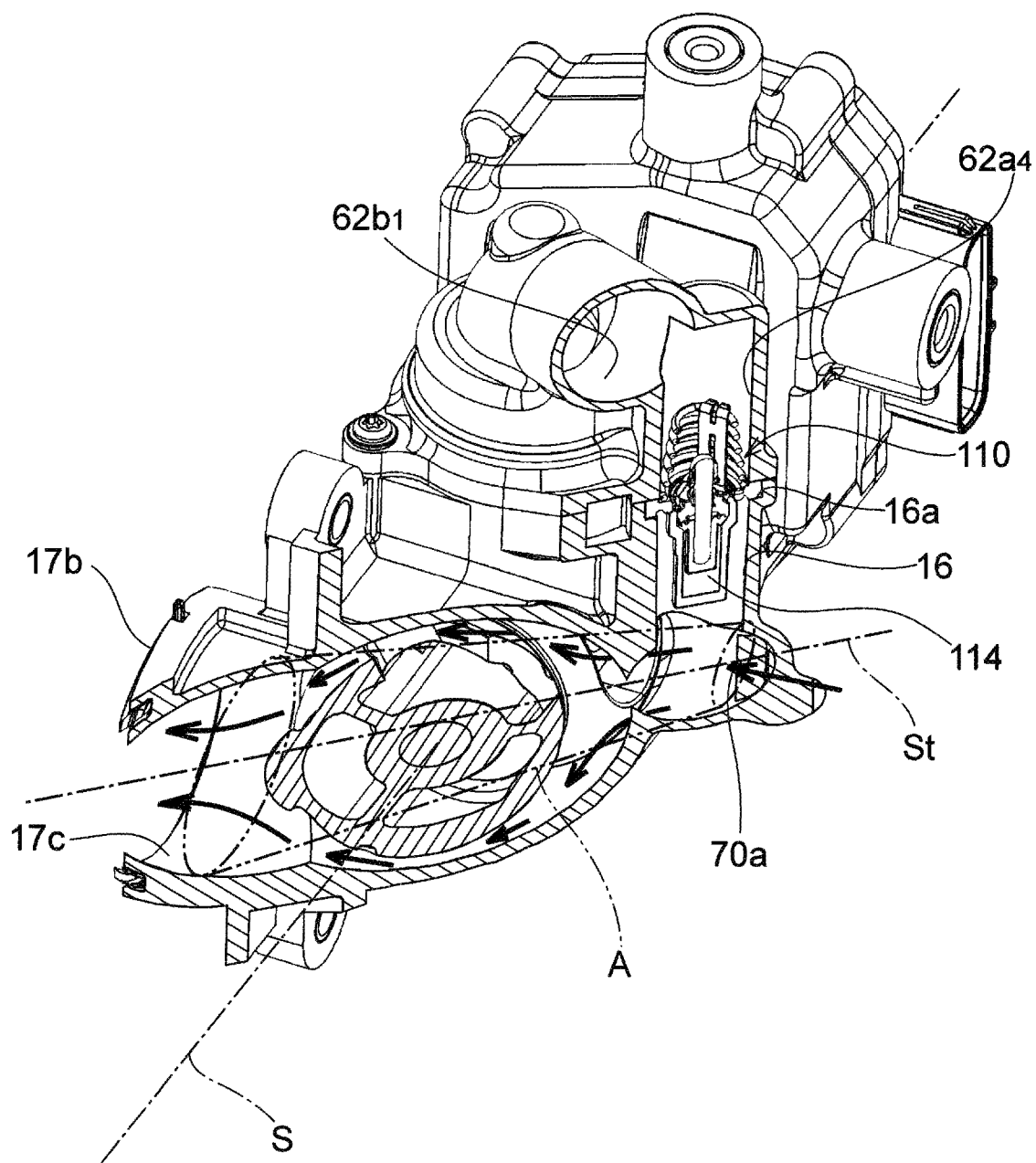
FIG. 11 is a perspective cross-sectional view of the rotary valve device according to an embodiment in a plane linearly connecting the inflow port where the fluid constantly flows in and the outflow port where the fluid constantly flows out.
Figure 12:
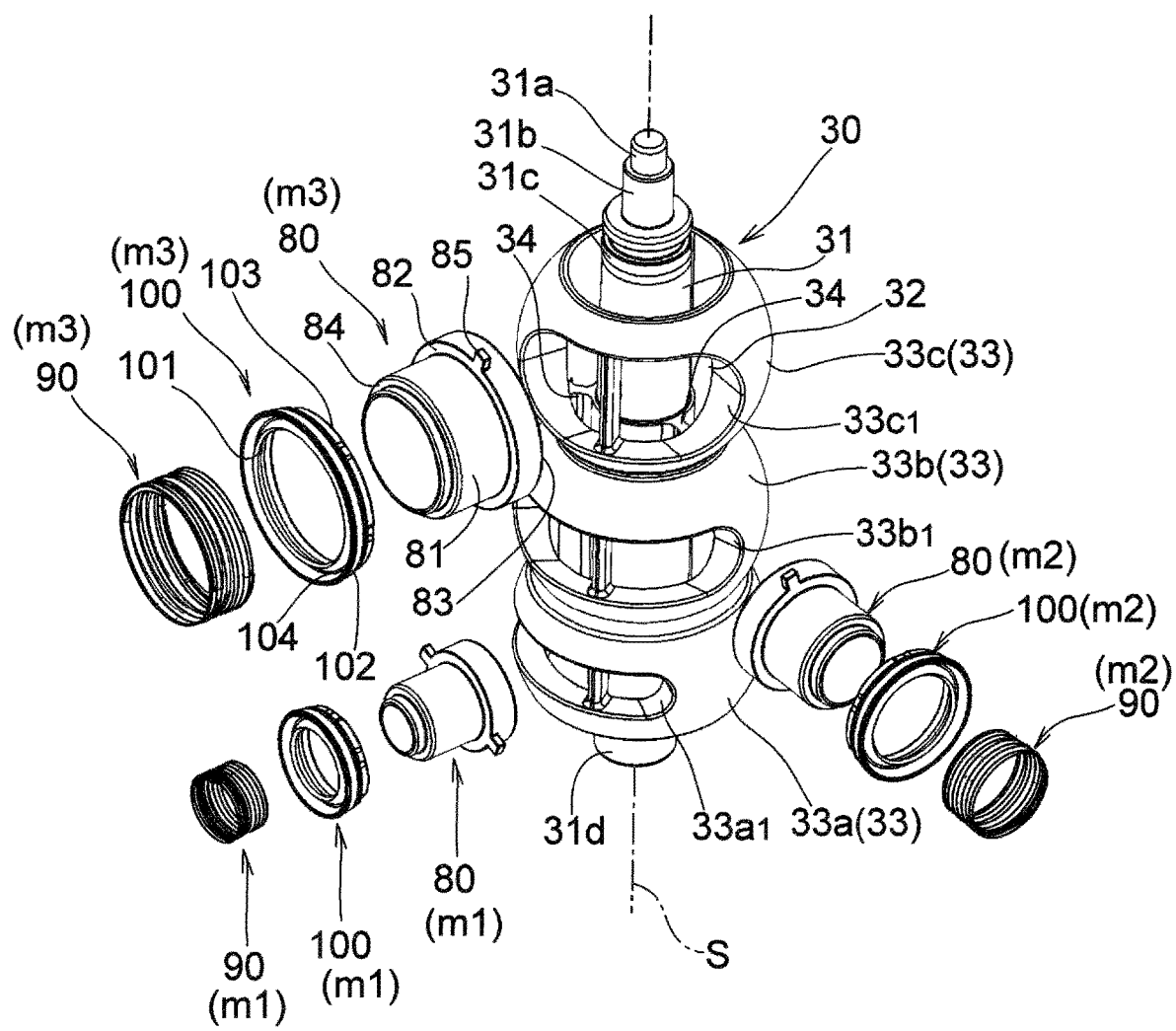
FIG. 12 is an exploded perspective view showing the relationship between the seal module (cylindrical seal member, urging spring, annular seal member) and the valve included in the rotary valve device according to an embodiment.

In the rotary valve device M having the above configuration, the passage members 40, 50, and 60 fitted into the fitting holes 12a, 13a, 14a, and 15a and the opening on the inner side of the connector member 70 function as inflow ports for the fluid (cooling water) to flow into the housing H. Further, as shown in FIG. 10 and FIG. 11, the opening 70a on the inner side of the connector member 70 fitted into the fitting hole 15a functions as an inflow port for the fluid (cooling water) to constantly flow into the housing H, and the opening 17c defined by the annular joining portion 17b functions as an outflow port for the fluid (cooling water) to constantly flow out from the housing H.

Here, as shown in FIG. 4, FIG. 6, FIG. 7, and FIG. 11, the through hole 16 is formed at a position facing the passage region that linearly connects the inflow port (opening 70a) and the outflow port (opening 17c), that is, the passage region A including the straight line St, so as to expose the heat sensing part 114 of the thermostat 110 to the constantly flowing fluid (cooling water). According to this, the heat sensing part 114 of the thermostat 110 arranged in the through hole 16 is constantly exposed to the fluid (cooling water) flowing in the shortest path in the housing H, rather than the fluid in the stagnation region in the housing H. Thus, the heat sensing part 114 can react to the accurate temperature of the fluid and can prevent the thermostat 110 from malfunctioning.

Furthermore, the housing H is formed in a cylindrical shape that is long in the direction of the axis S, and the inflow port (opening 70a) where the fluid constantly flows in and the outflow port (opening 17c) where the fluid constantly flows out are arranged in the housing H to open in the radial direction perpendicular to the axis S. According to this, as shown in FIG. 1, the rotary valve device M can be arranged along the wall surface of the target object (engine E), and the protrusion amount from the wall surface of the engine E can be suppressed to achieve integration and miniaturization of the entire system around the engine E.

Next, the operation of the rotary valve device M will be described. First, when the water pump 1 rotates at the start of the engine E, by appropriately controlling the rotary valve device M, the cooling water existing in the cooling water circulation system flows out from the cooling water passage in the engine E, flows into the housing H of the device M through the radiator 2, the heater 3, and the oil cooler 4 via the respective pipes, flows from the device M into the engine E via the water pump 1, and circulates in these paths.

Specifically, the rotation position of the valve 30 is appropriately driven and controlled by the drive unit 120 according to mode 1 to mode 4 shown in FIG. 18 so that the openings $33a_1$, $33b_1$, and $33c_1$ are opened/closed appropriately. In mode 1, the opening $33a_1$ is closed, and the circulation of the cooling water to the oil cooler 4 is blocked. The opening $33b_1$ is closed, and the flow of the cooling water returning from the heater 3 to the passage member 50 is blocked. The opening $33c_1$ is closed, and the circulation of the cooling water to the radiator 2 is blocked. In contrast, the cooling water returning from the heater 3 to the connector member 70 through the bypass passage 5 flows out from the housing H and circulates through the engine E and the heater 3.

In mode 2, the opening $33a_1$ is closed, and the circulation of the cooling water to the oil cooler 4 is blocked. The opening $33b_1$ is opened, and the cooling water returning from the heater 3 to the passage member 50 flows out from the housing H and circulates through the engine E. The opening $33c_1$ is closed, and the circulation of the cooling water to the radiator 2 is blocked. The cooling water returning from the heater 3 to the connector member 70 through the bypass passage 5 flows out from the housing H and circulates through the engine E and the heater 3.

In mode 3, the opening $33a_1$ is opened, and the cooling water returning from the oil cooler 4 to the passage member 40 flows out from the housing H and circulates through the engine E. The opening $33b_1$ is opened, and the cooling water returning from the heater 3 to the passage member 50 flows out from the housing H and circulates through the engine E. The opening $33c_1$ is closed, and the circulation of the cooling water to the radiator 2 is blocked. The cooling water returning from the heater 3 to the connector member 70 through the bypass passage 5 flows out from the housing H and circulates through the engine E and the heater 3.

In mode 4, the opening $33a_1$ is opened, and the cooling water returning from the oil cooler 4 to the passage member 40 flows out from the housing H and circulates through the engine E. The opening $33b_1$ is opened, and the cooling water returning from the heater 3 to the passage member 50 flows out from the housing H and circulates through the engine E. The opening $33c_1$ is opened, and the cooling water returning from the radiator 2 to the passage member 60 flows out from the housing H and circulates through the engine E. The cooling water returning from the heater 3 to the connector member 70 through the bypass passage 5 flows out from the housing H and circulates through the engine E and the heater 3.

In this way, the cooling water returning from the heater 3 to the connector member 70 through the bypass passage 5 constantly circulates in the cooling water circulation system. Here, the thermostat 110 does not operate when the valve 30 is operating normally, and when the temperature of the cooling water reaches a predetermined temperature or higher in an abnormal state such as when the valve 30 malfunctions while the opening $33c_1$ is closed, the thermostat 110 opens the valve to open the detour passage $62a_4$. As a result, the cooling water circulates through the radiator 2 and the temperature of the cooling water is lowered.

As described above, with the rotary valve device M of the above embodiment, the passage member can be easily molded with a mold or the like, the assembling work is easy, and the seal module composed of a plurality of members can be assembled with high accuracy.

In the above embodiment, the cylindrical seal member 80, the urging spring 90, and the annular seal member 100 are shown as the seal module, but the disclosure is not limited thereto. The annular seal member 100 may be omitted if the desired sealing performance is secured between the cylindrical holding member 61 and the cylindrical seal member 80. In this case, the cylindrical holding member 61 holds the cylindrical seal member 80 and the urging spring 90.

In the above embodiment, the housing H is formed by the housing body 10 and the housing cover 20, but the disclosure is not limited thereto. Housings having other forms or configurations may be adopted. The above embodiment shows a case where the inflow port (opening 70a) and the outflow port (opening 17c) for the fluid are arranged in the housing H to open in the radial direction perpendicular to the axis S, but the disclosure is not limited thereto. The disclosure may also be adopted in a configuration that includes an inflow port or outflow port for the fluid at an end of the housing in the direction of the axis S. Further, the disclosure may also be adopted in a configuration that uses the inflow port (opening 70a) for the fluid as the outflow port and uses the outflow port (opening 17c) for the fluid as the inflow port.

The above embodiment shows the valve 30 in which the outer peripheral wall 33 of the valve includes the outer peripheral surfaces (first outer peripheral surface 33a, second outer peripheral surface 33b, third outer peripheral surface 33c) that form three spherical surfaces, but the disclosure is not limited thereto. A valve having one outer peripheral surface or two, four or more outer peripheral surfaces as the outer peripheral wall, or a valve having a cylindrical outer peripheral surface may be adopted.

As mentioned above, with the rotary valve device of the disclosure, the passage member can be easily molded with a mold or the like, the assembling work is easy, and the seal module composed of a plurality of members can be assembled with high accuracy. Therefore, the rotary valve device of the disclosure not only can be applied to a cooling water control system for a vehicle or the like, but also is useful in other fluid control systems for controlling the flow of a fluid.

What is claimed is:

1. A rotary valve device, comprising:
   a cylindrical valve that rotates around a predetermined axis and has a passage which opens on an outer peripheral wall;
   a housing that rotatably accommodates the cylindrical valve and has a fitting hole facing the outer peripheral wall, a through hole adjacent to the fitting hole, and a joining surface located at ends of the fitting hole and the through hole;
   a thermostat that is partially accommodated in the through hole;
   a cylindrical seal member that abuts on the outer peripheral wall to define a passage;
   an urging spring that urges the cylindrical seal member toward the outer peripheral wall; and
   a passage member that is assembled to the housing to communicate with the passage of the cylindrical seal member,
   wherein the passage member comprises a cylindrical holding member that is fitted into the fitting hole and holds the cylindrical seal member and the urging spring, and a connector member that defines a main passage communicating with the passage of the cylindrical seal member and is joined to the joining surface to be connected to outside, and
   the connector member comprises an annular fitting recess into which a part of the cylindrical holding member is fitted, and a detour passage that is divided from the fitting recess by a wall portion to partially accommodate the thermostat and bypasses the cylindrical seal member to communicate with the through hole.

2. The rotary valve device according to claim 1, wherein the cylindrical holding member and the connector member are molded products molded by molding using the same material.

3. The rotary valve device according to claim 1, wherein the connector member comprises a flange base portion that defines a part of the main passage, the fitting recess, and the detour passage and is joined to the joining surface, and a pipe portion that protrudes from the flange base portion and defines a part of the main passage with which the detour passage communicates.

4. The rotary valve device according to claim 3, wherein the pipe portion is formed so as to extend in an angular direction inclined with respect to center line directions of the fitting hole and the through hole.

5. The rotary valve device according to claim 3, wherein a center line of the detour passage is arranged around a center line of the fitting recess at a position deviated from a center line of the pipe portion.

6. The rotary valve device according to claim 1, wherein the cylindrical holding member holds an annular seal member that provides sealing between an inner peripheral surface of the cylindrical holding member and an outer peripheral surface of the cylindrical seal member.

7. The rotary valve device according to claim 6, wherein the cylindrical holding member comprises a regulating portion that restricts detachment of the cylindrical seal member in a state where the urging spring, the annular seal member, and the cylindrical seal member are incorporated on an inner side of the cylindrical holding member.

8. The rotary valve device according to claim 1, wherein the housing has an inflow port where a fluid constantly flows in and an outflow port where the fluid constantly flows out, and the through hole is formed at a position facing a passage region linearly connecting the inflow port and the outflow port so as to expose a heat sensing part of the thermostat to the fluid that constantly flows.

9. The rotary valve device according to claim 8, wherein the housing is formed in a cylindrical shape that is long in a direction of the axis, and the inflow port and the outflow port are arranged in the housing so as to open in a radial direction perpendicular to the axis.

10. The rotary valve device according to claim 9, wherein the housing comprises a housing body that defines an internal space which is long in the direction of the axis and has an opening at one end, and a housing cover that is joined to the housing body so as to close the opening.

11. The rotary valve device according to claim 10, wherein the housing body has an accommodation recess that accommodates a drive unit for driving the cylindrical valve on a side opposite to the opening in the direction of the axis.

12. The rotary valve device according to claim 10, wherein the housing body comprises a flange portion that is to be attached to a wall portion of a target object, and an annular joining portion that defines the outflow port in an inner region of the flange portion.

13. The rotary valve device according to claim 1, wherein the outer peripheral wall of the cylindrical valve has a plurality of outer peripheral surfaces that form spherical surfaces continuous in the direction of the axis, and the cylindrical seal member is arranged to face at least one outer peripheral surface of the plurality of outer peripheral surfaces.

* * * * *